Nov. 5, 1946.  S. N. WIGHT ET AL  2,410,540
AIRWAY TRAFFIC CONTROL SYSTEM
Filed Nov. 20, 1943  20 Sheets-Sheet 1
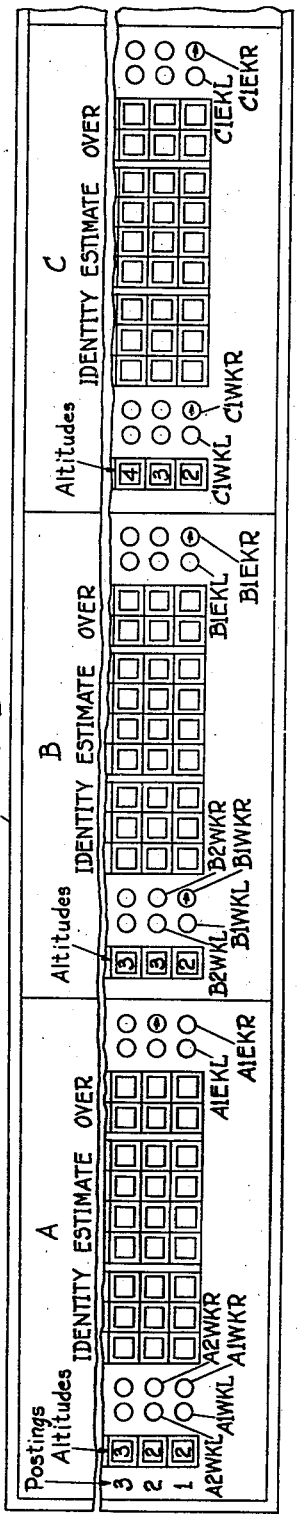
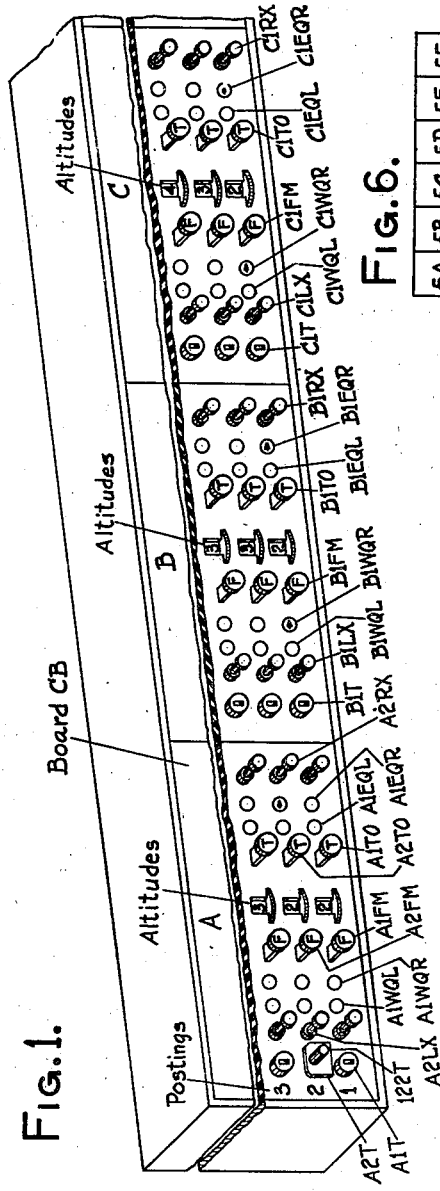
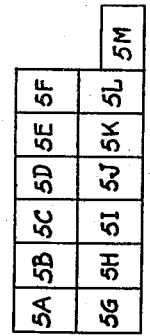
Inventors
S. N. Wight and O. S. Field
By Neil W. Pleton,
Their Attorney Nov. 5, 1946.  S. N. WIGHT ET AL  2,410,540
AIRWAY TRAFFIC CONTROL SYSTEM
Filed Nov. 20, 1943   20 Sheets-Sheet 3

Inventors
S. N. Wight and O. S. Field
Their Attorney

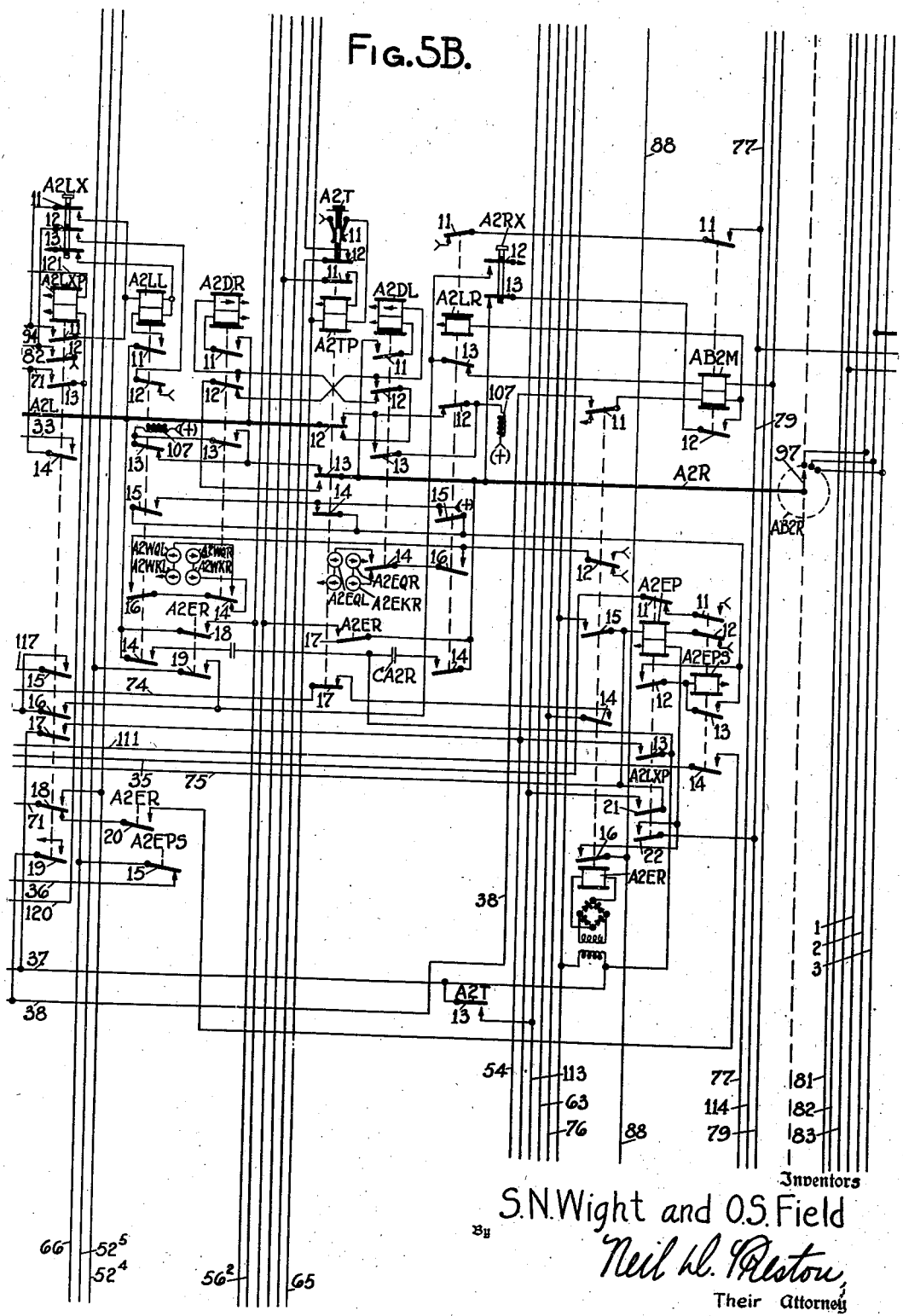

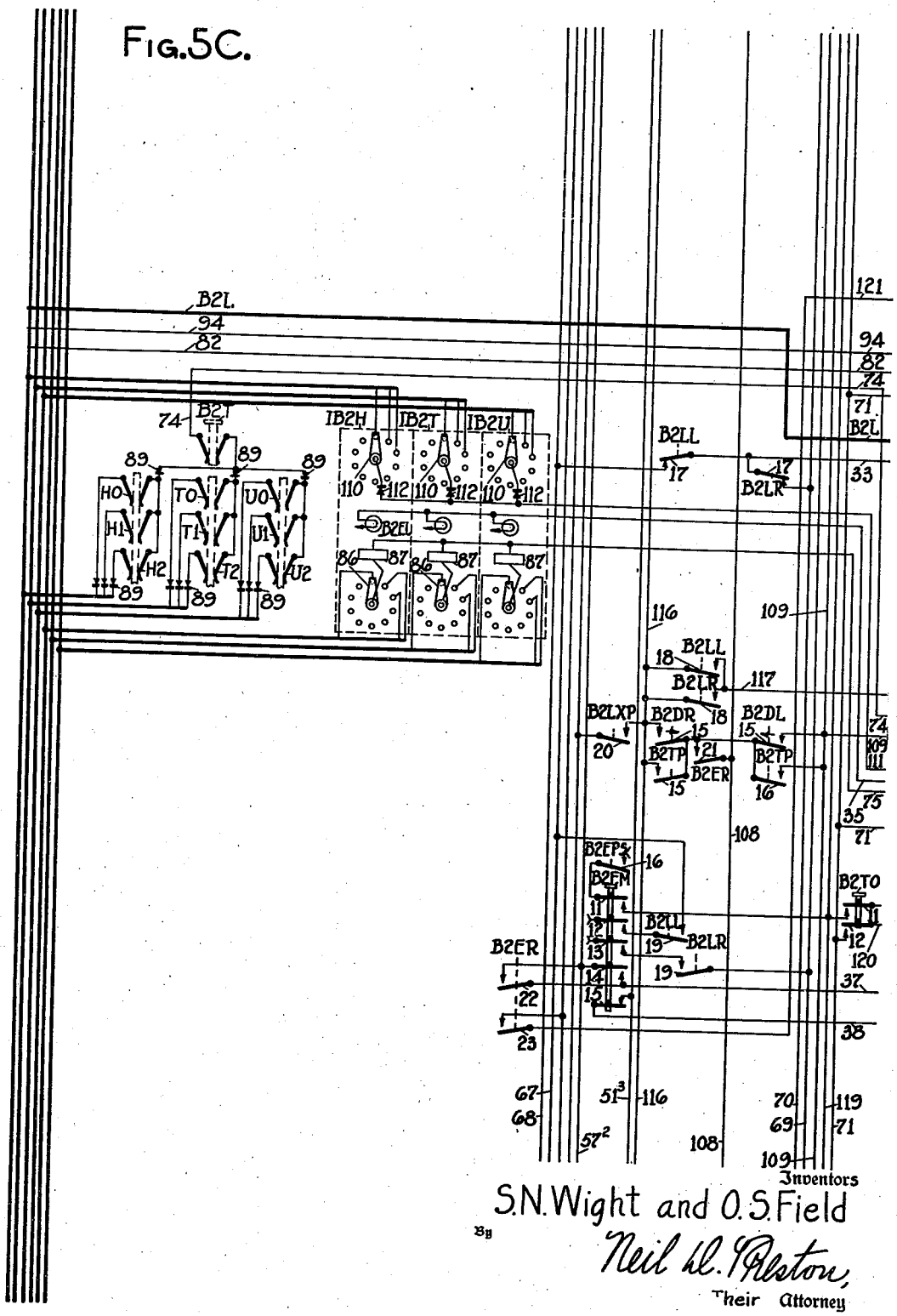

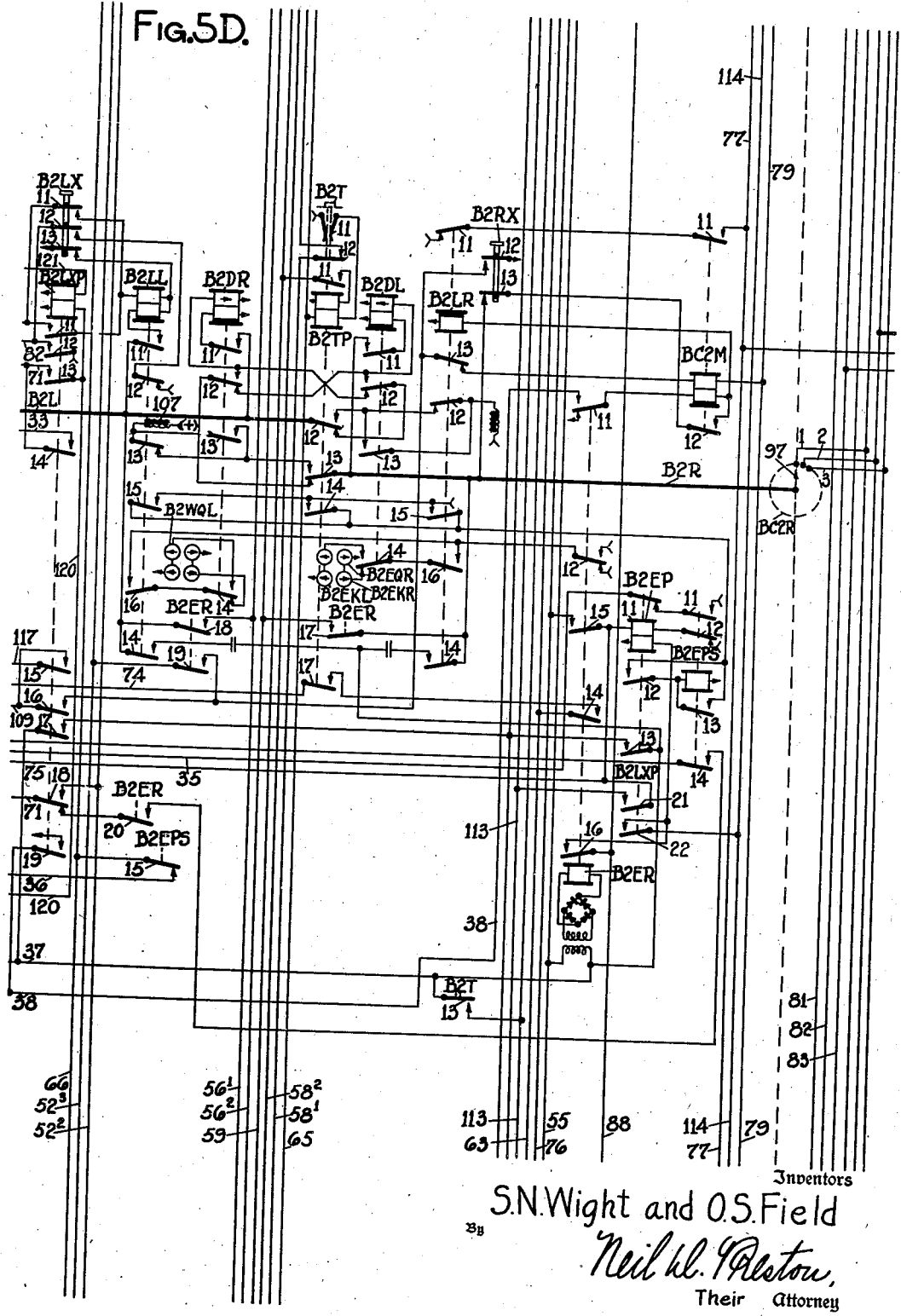

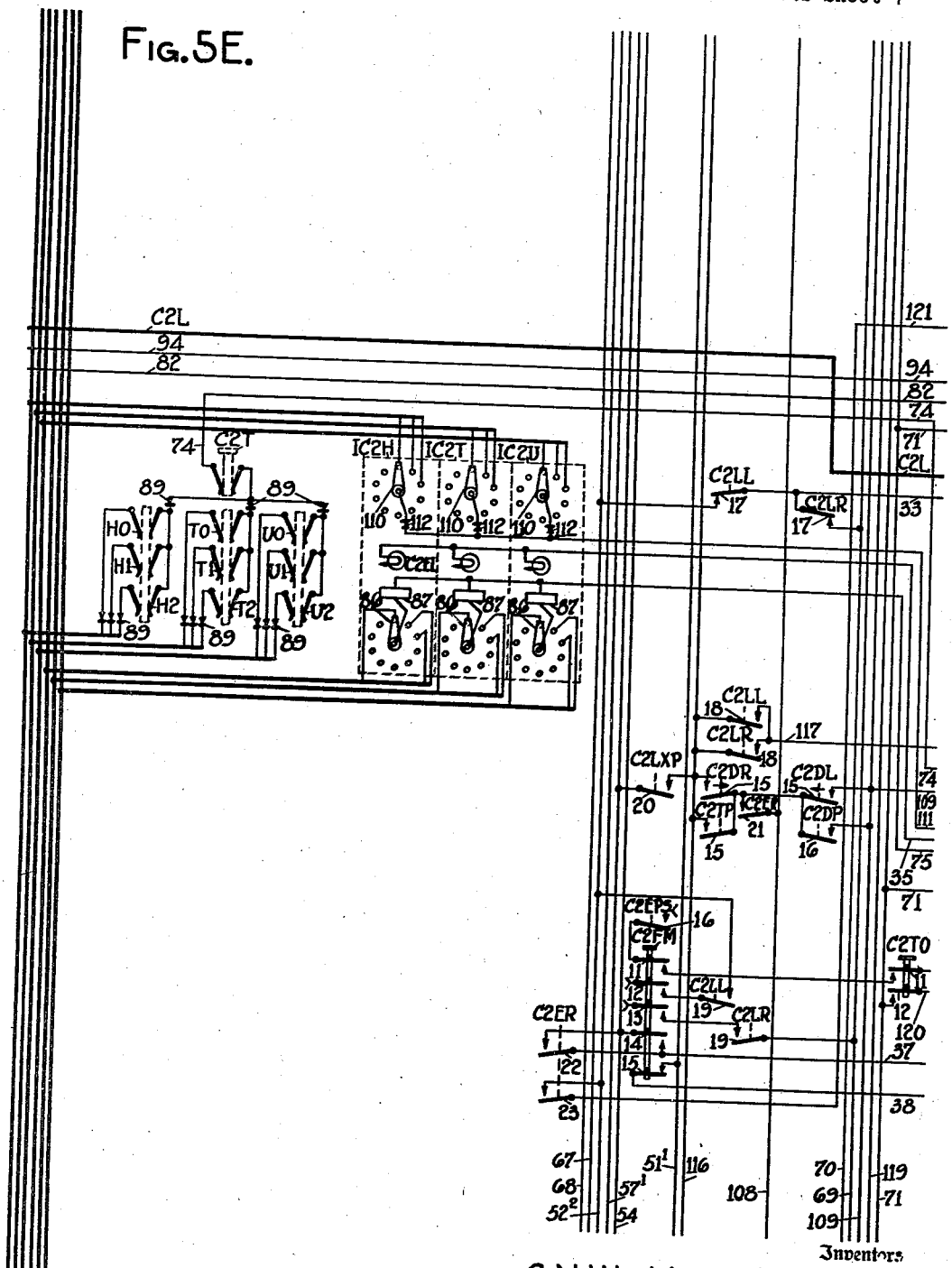

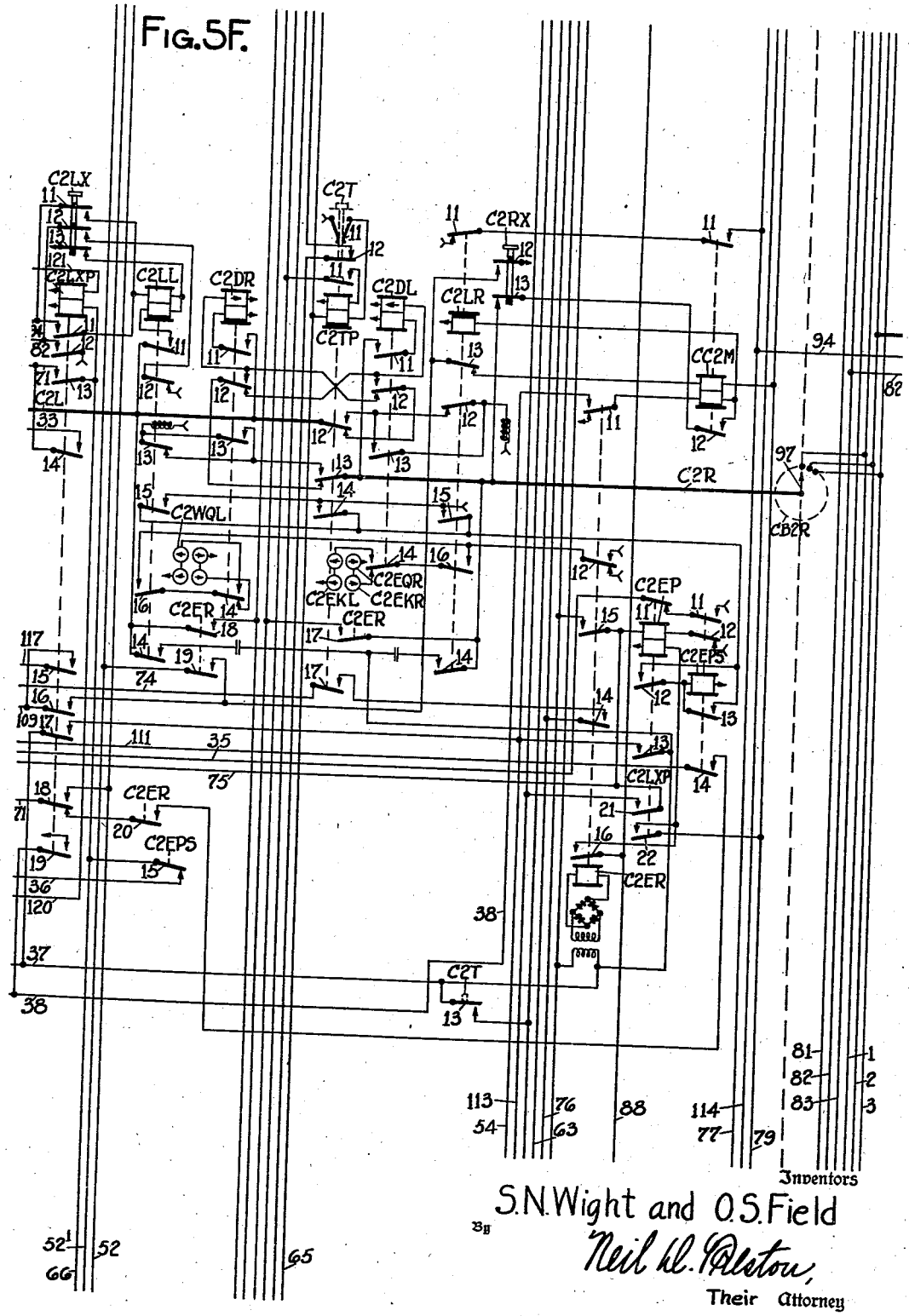

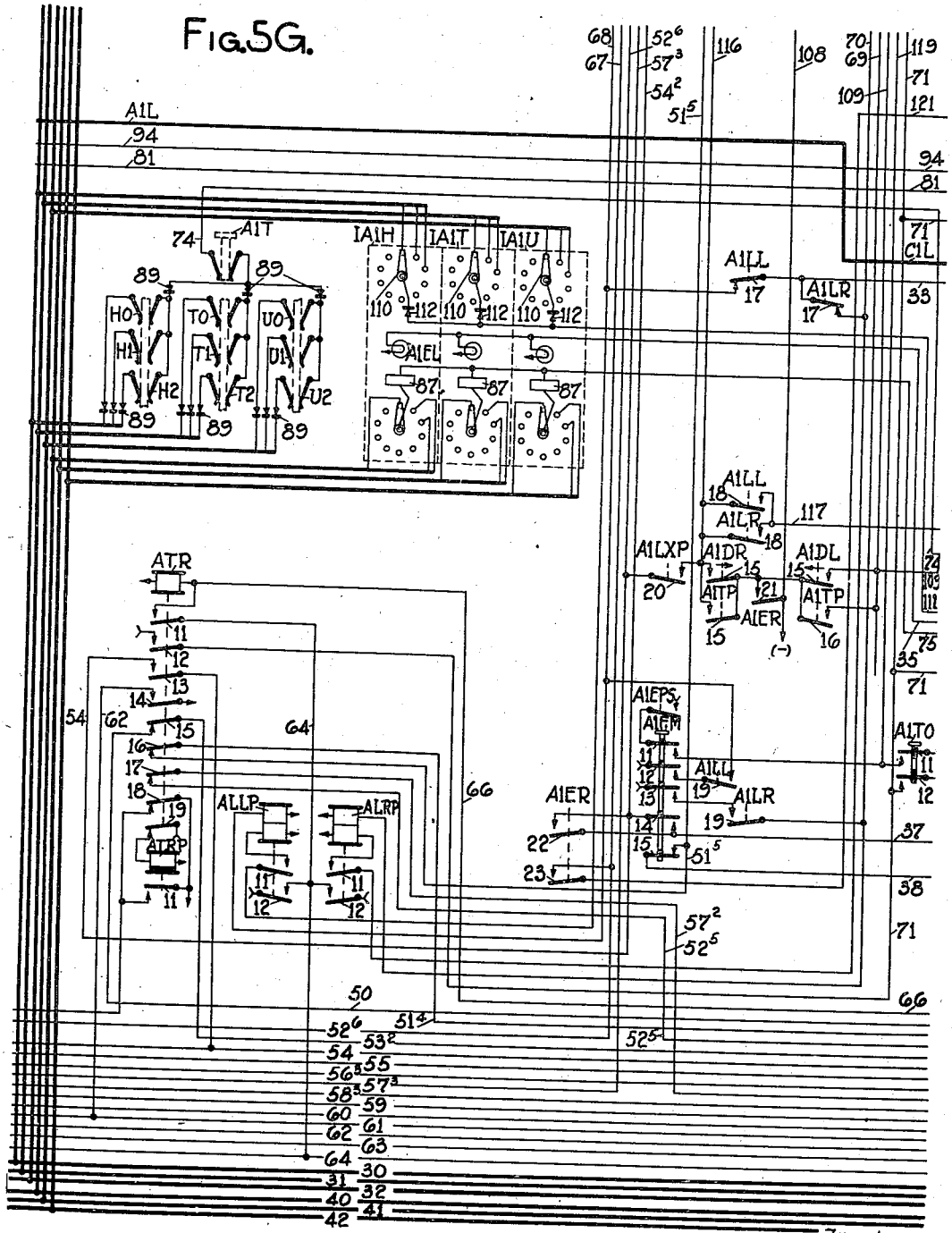

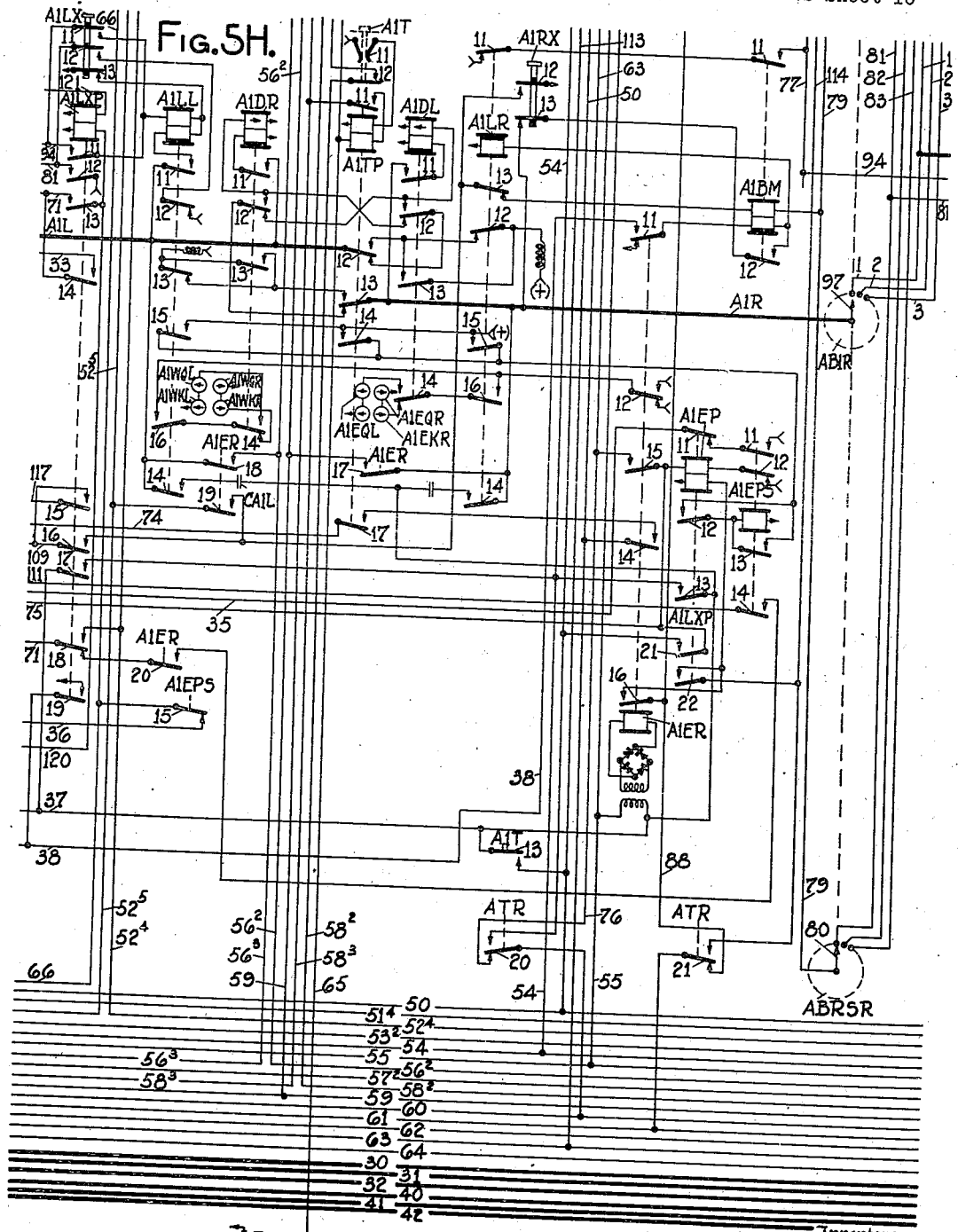

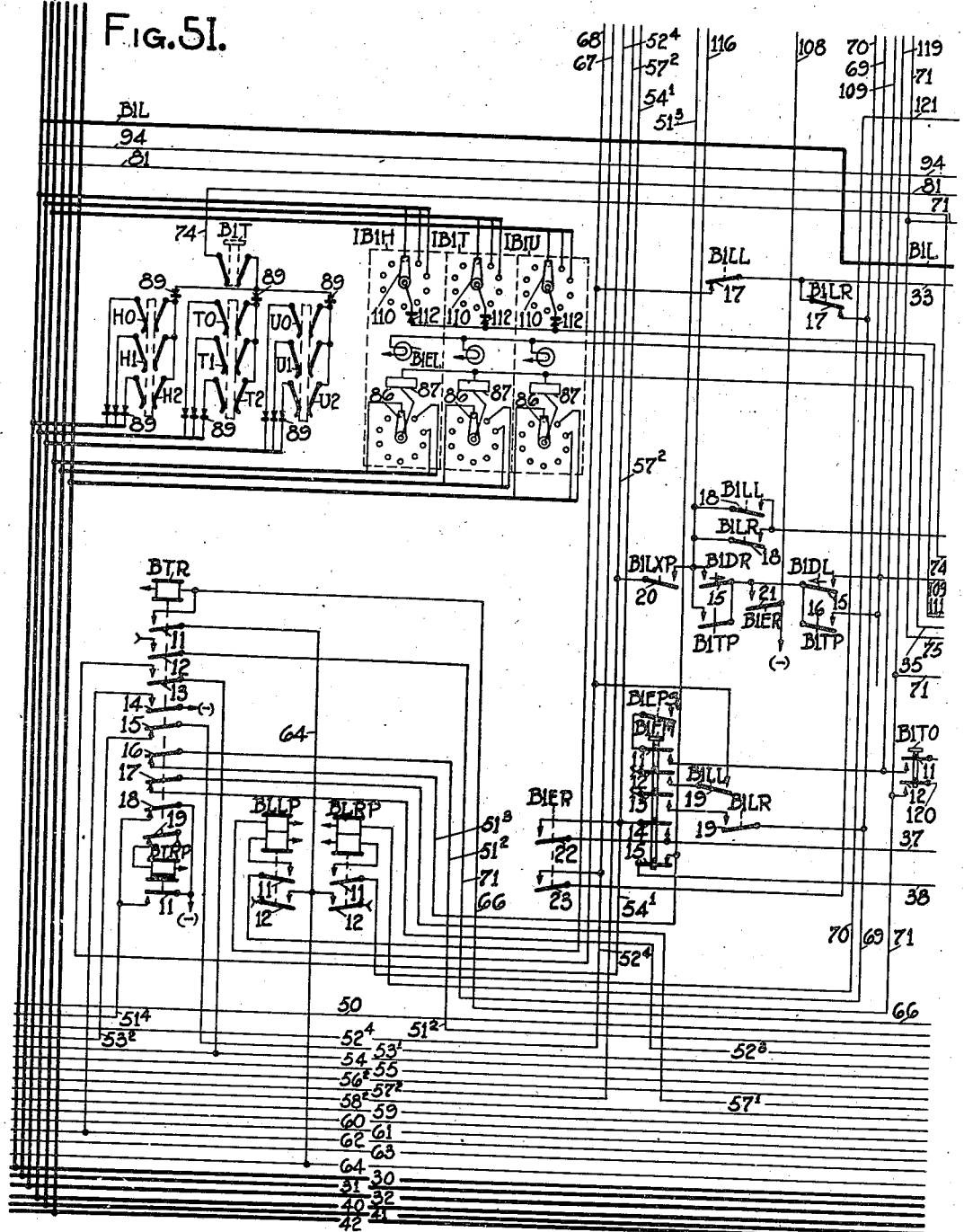

Nov. 5, 1946.　　　S. N. WIGHT ET AL　　　2,410,540
AIRWAY TRAFFIC CONTROL SYSTEM
Filed Nov. 20, 1943　　　20 Sheets-Sheet 12
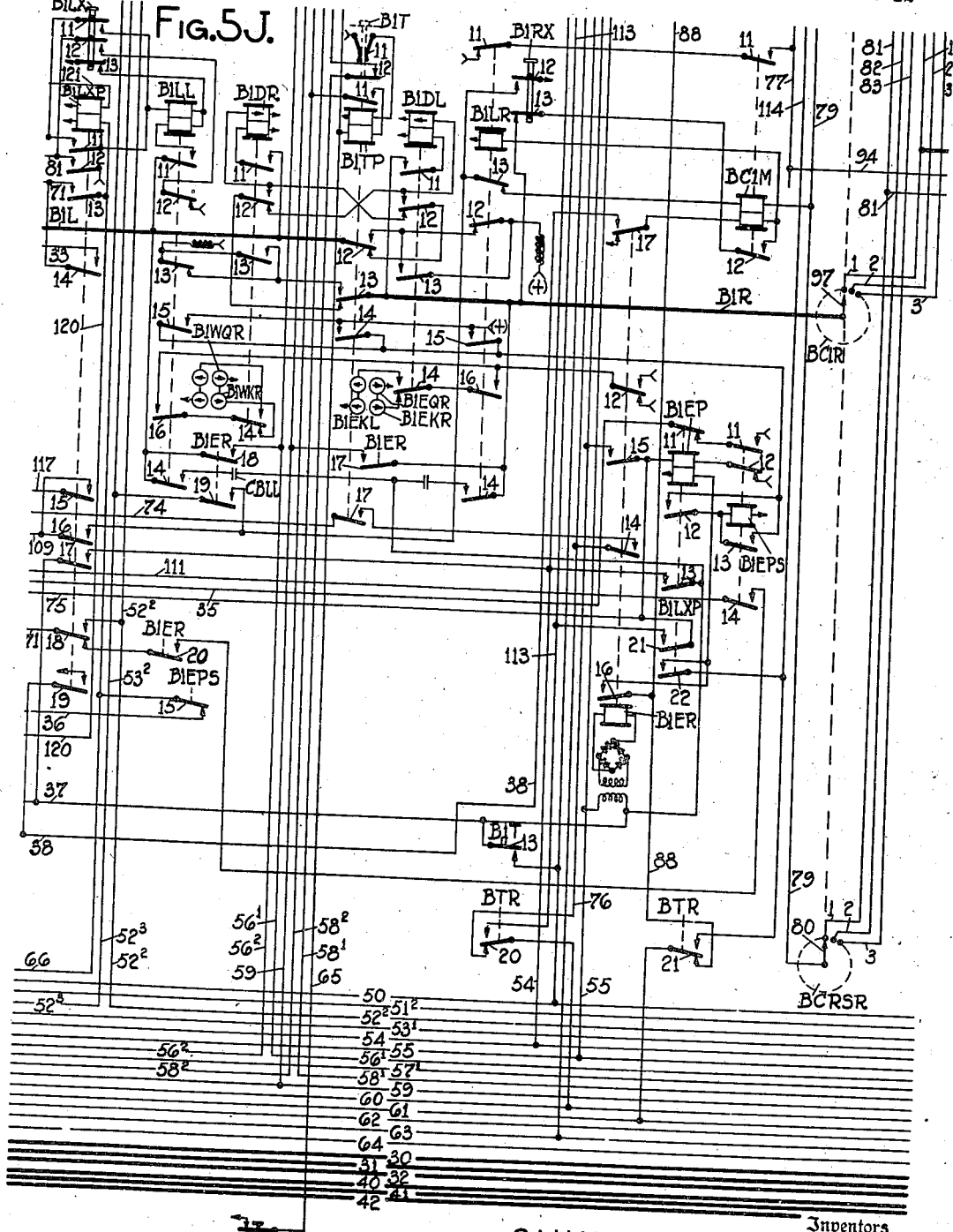
Inventors
S.N.Wight and O.S.Field
By Neil W. Preston,
Their Attorney

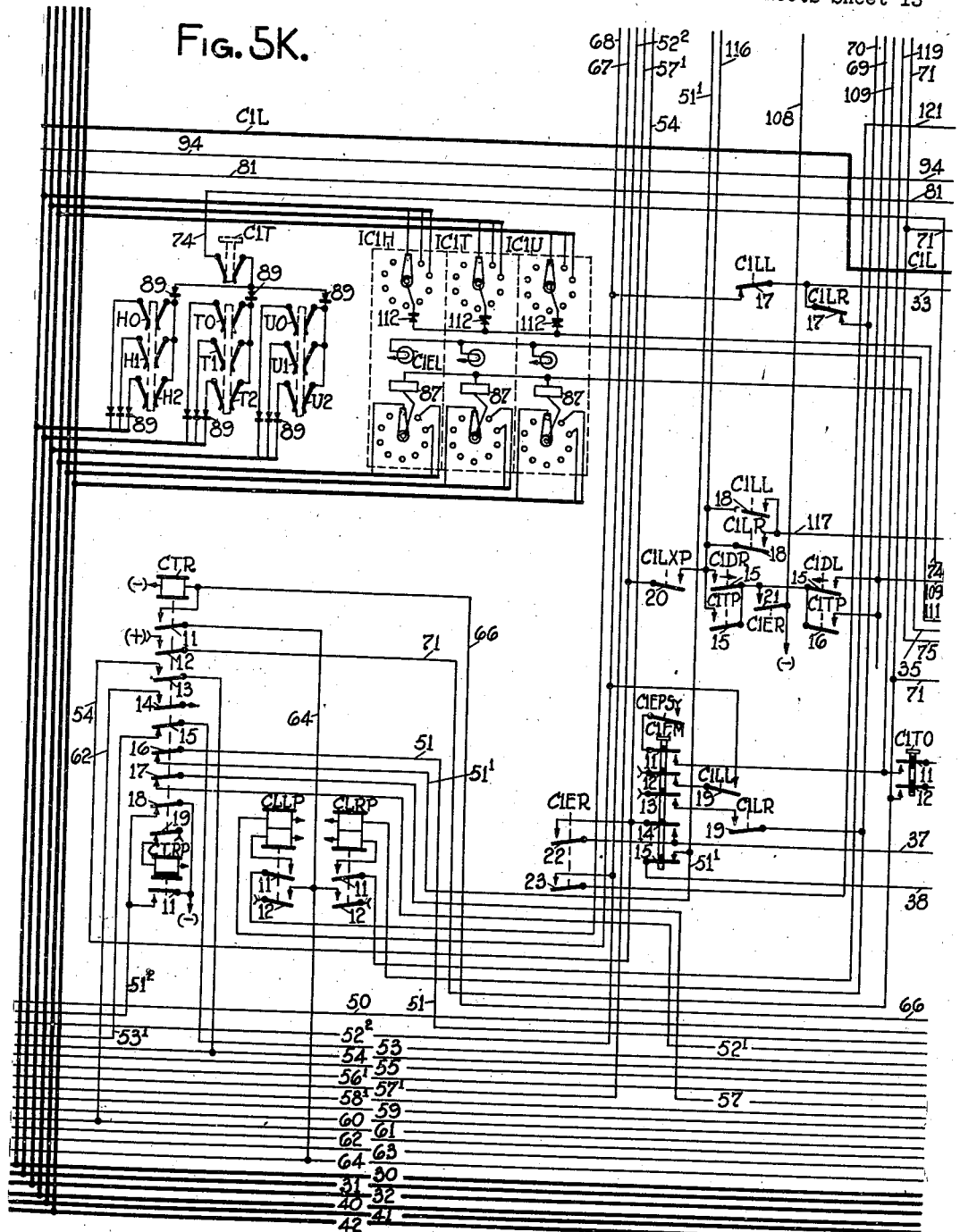

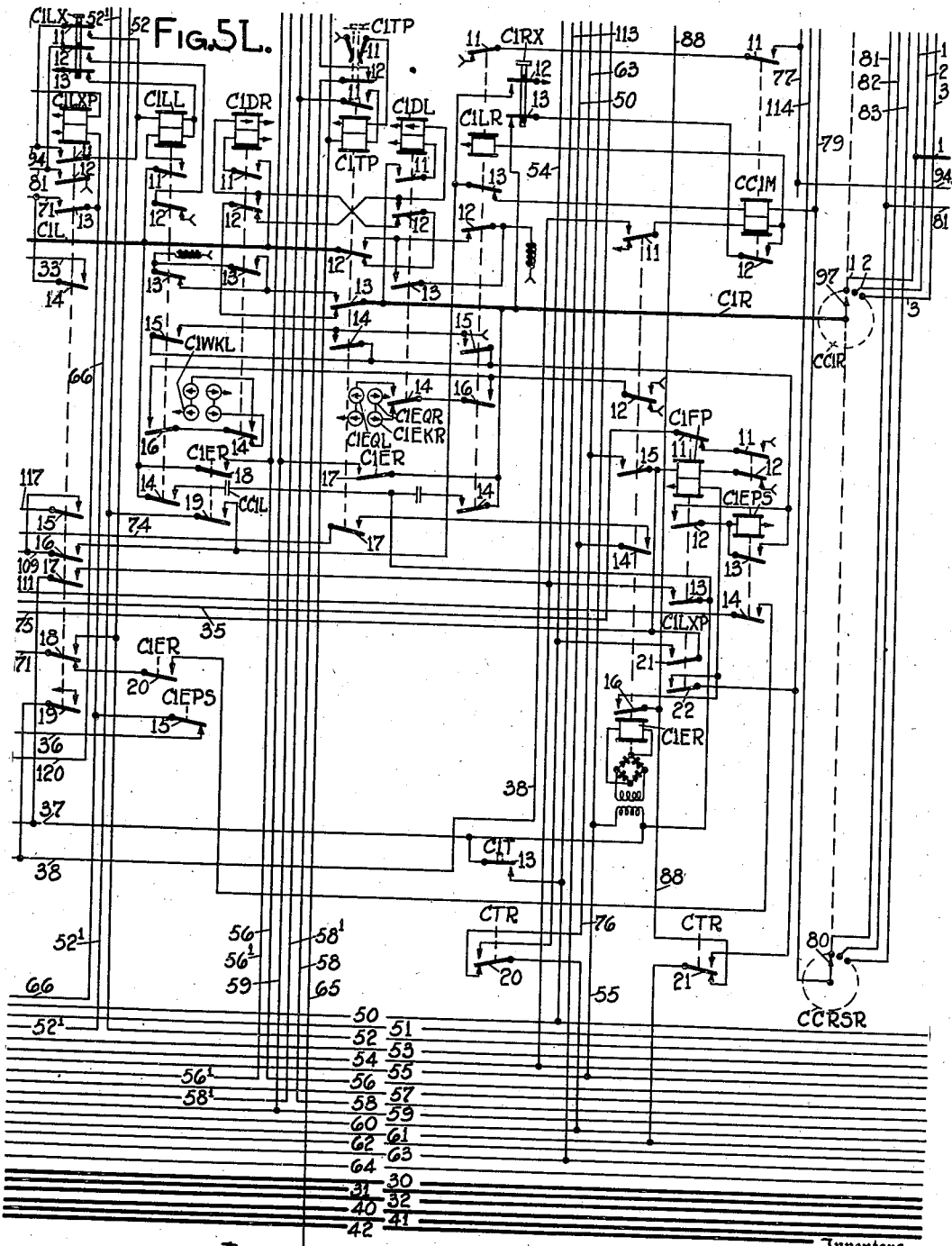

Nov. 5, 1946.   S. N. WIGHT ET AL   2,410,540
AIRWAY TRAFFIC CONTROL SYSTEM
Filed Nov. 20, 1943   20 Sheets-Sheet 15
FIG. 5M.
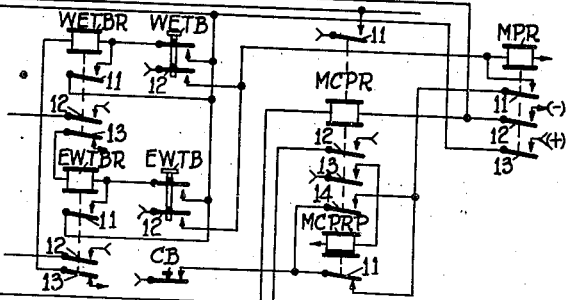
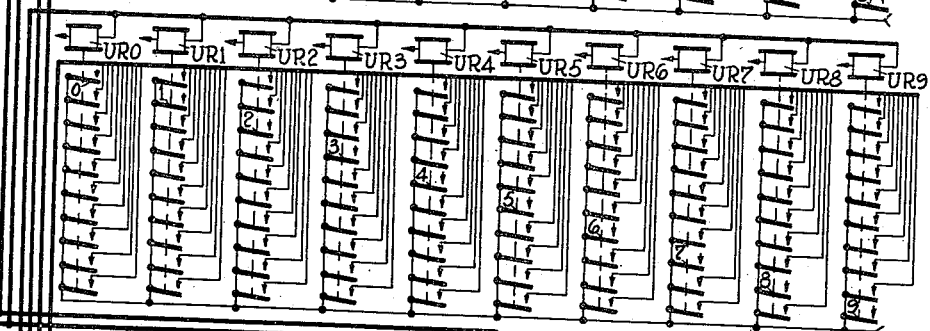
Inventors
S. N. Wight and O. S. Field
By Neil W. Preston,
Their Attorney Nov. 5, 1946.  S. N. WIGHT ET AL  2,410,540
AIRWAY TRAFFIC CONTROL SYSTEM
Filed Nov. 20, 1943  20 Sheets-Sheet 16
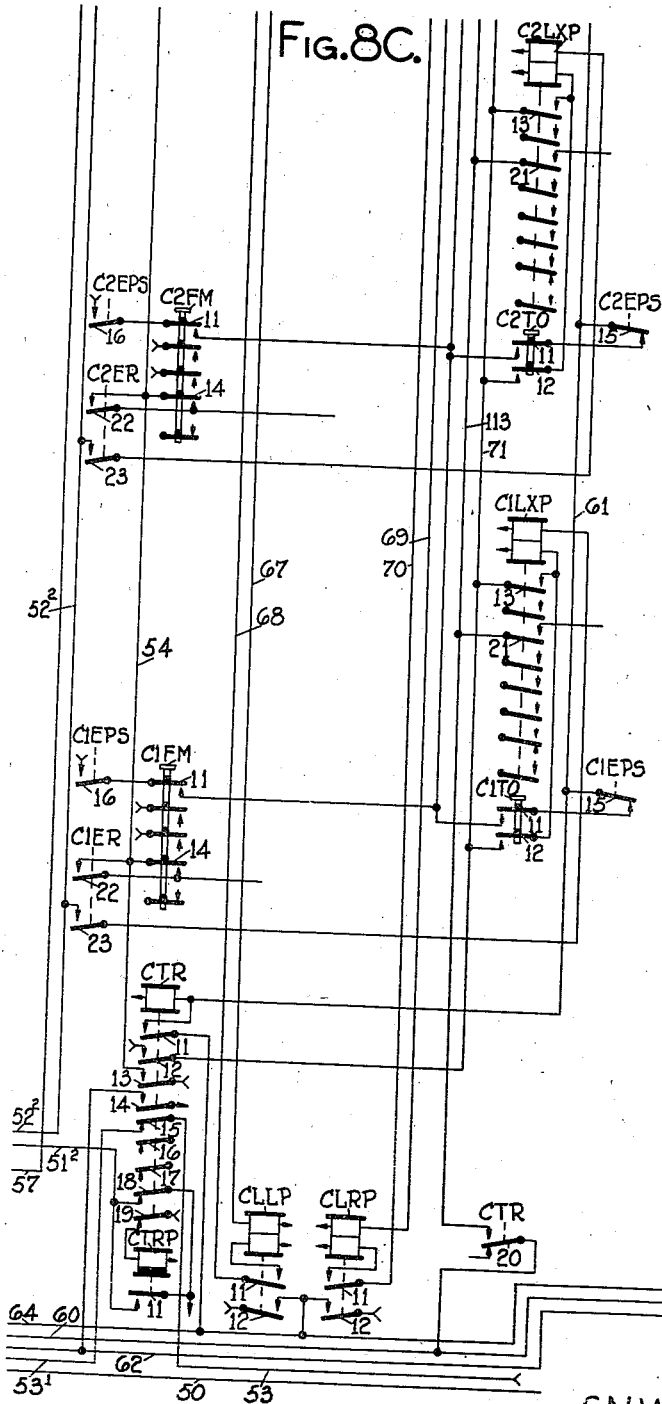
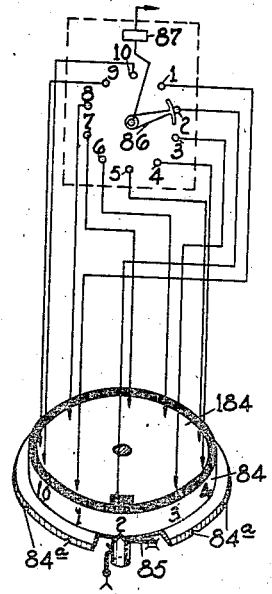
Inventors
S. N. Wight and O. S. Field
Their Attorney

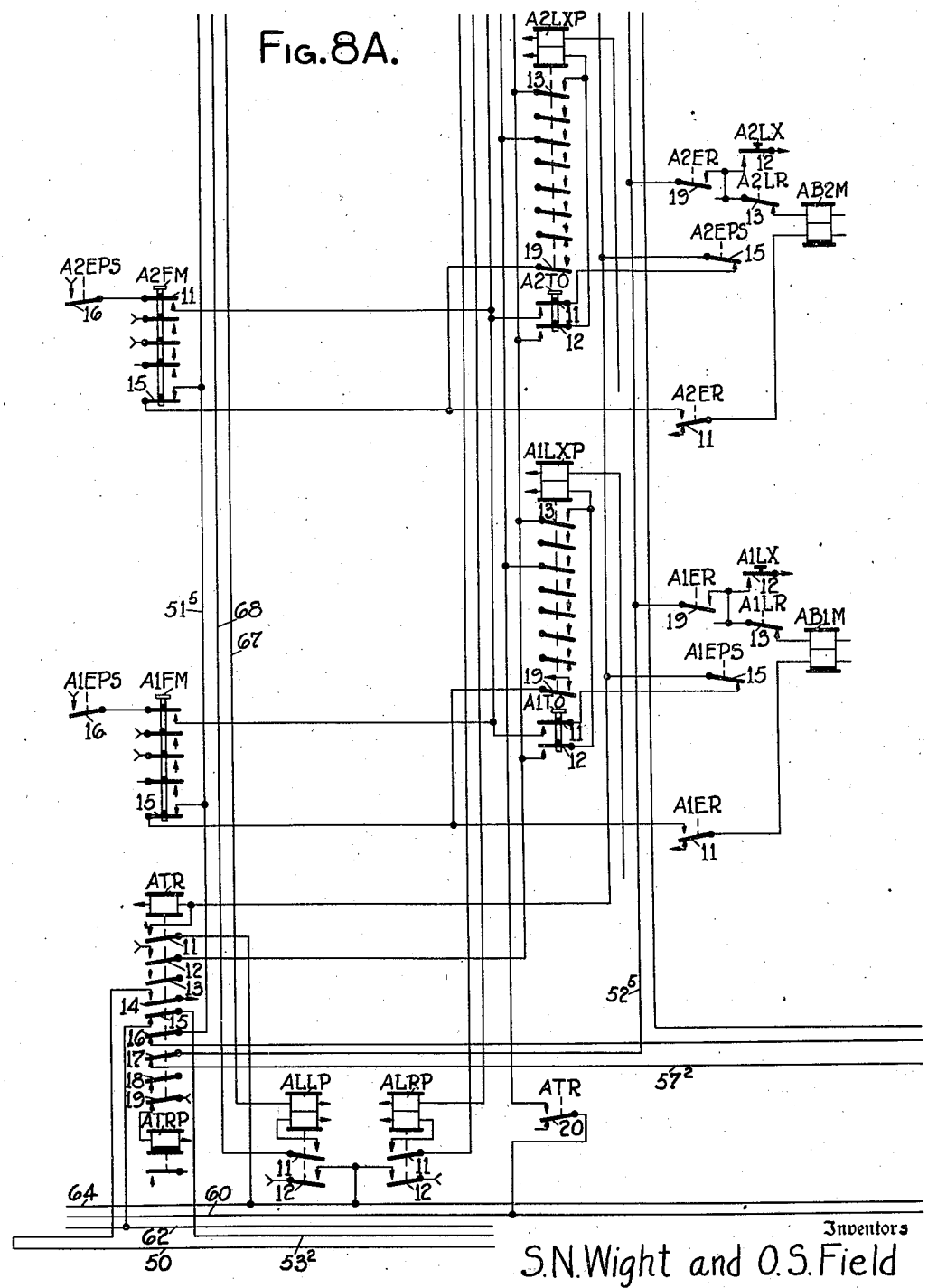

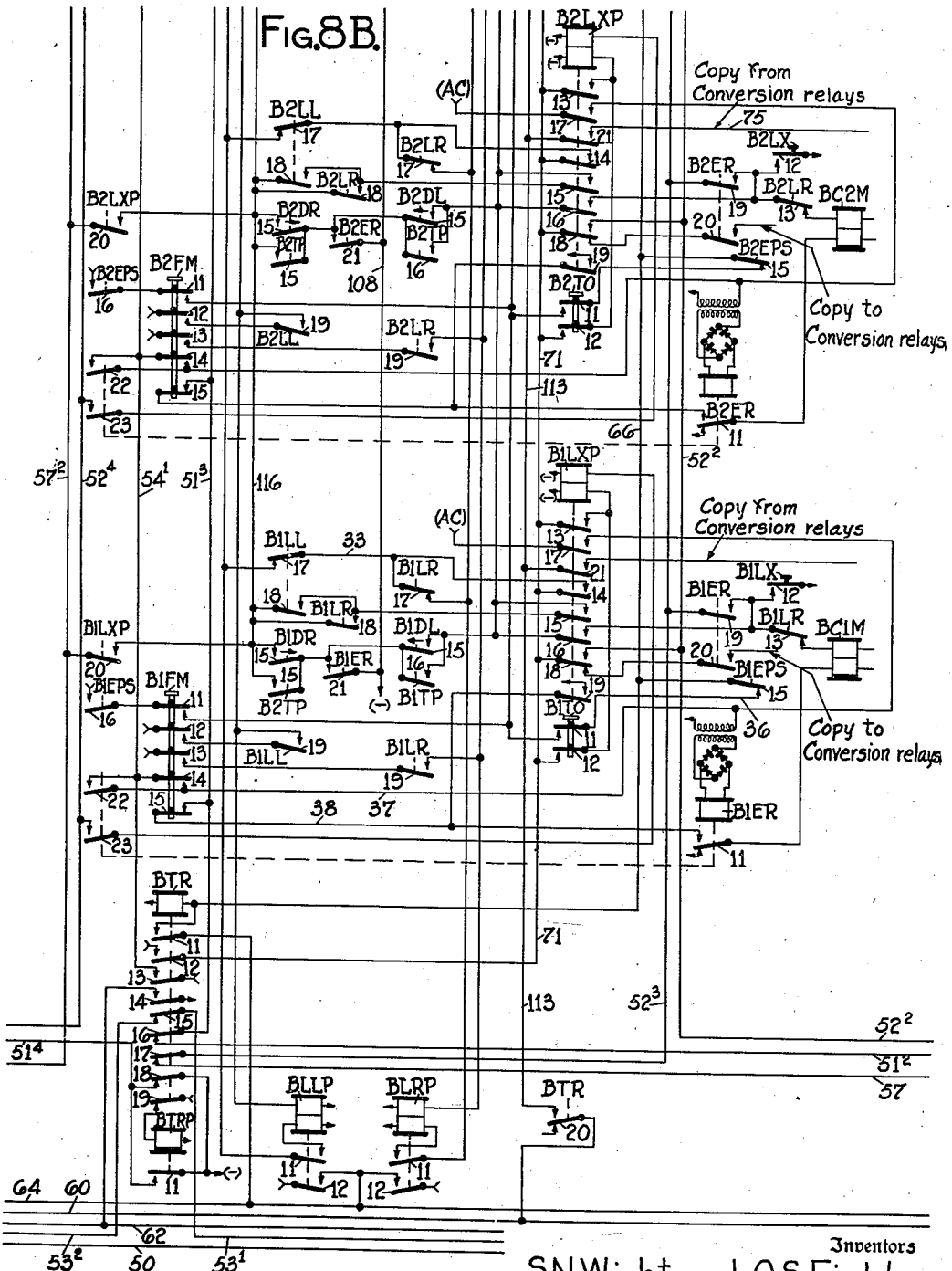

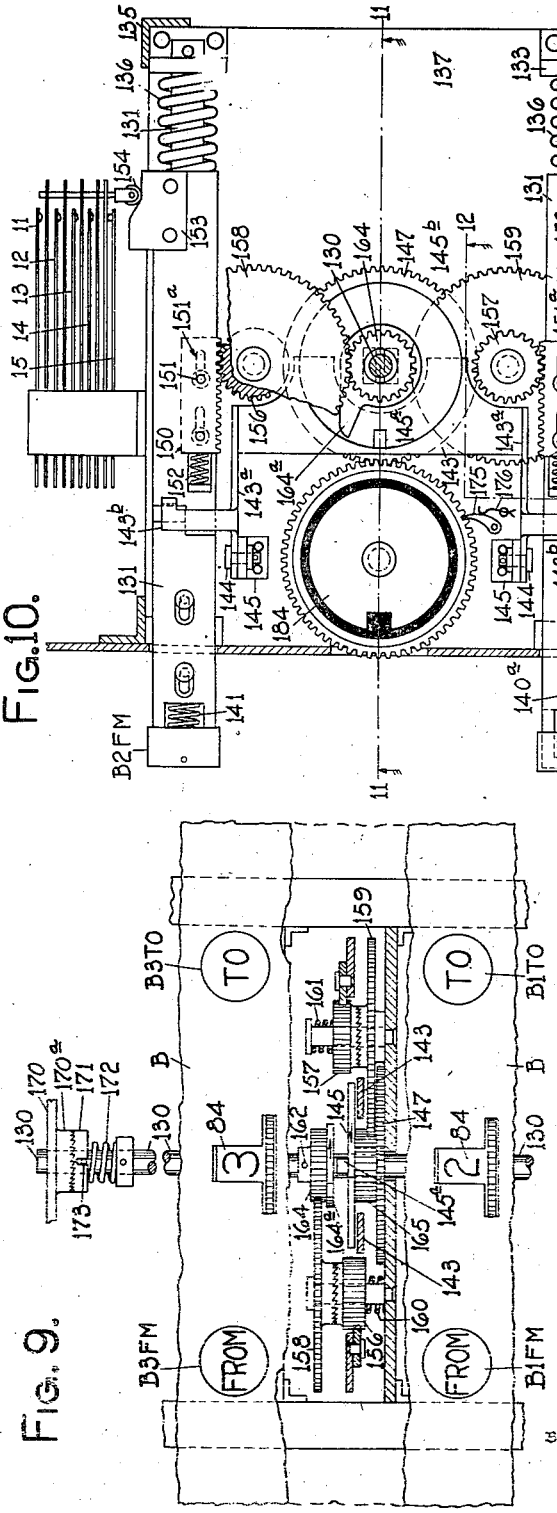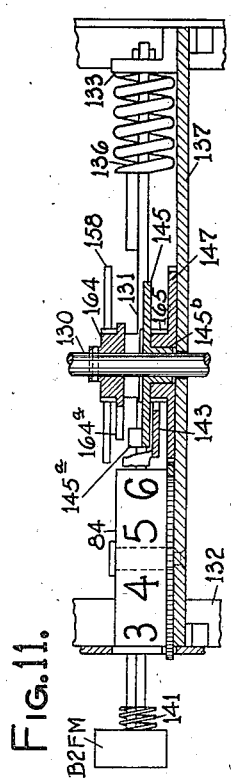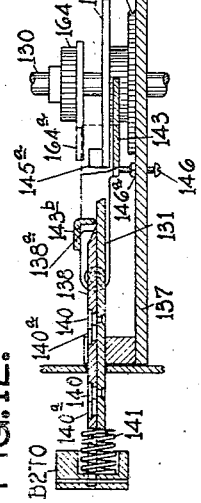

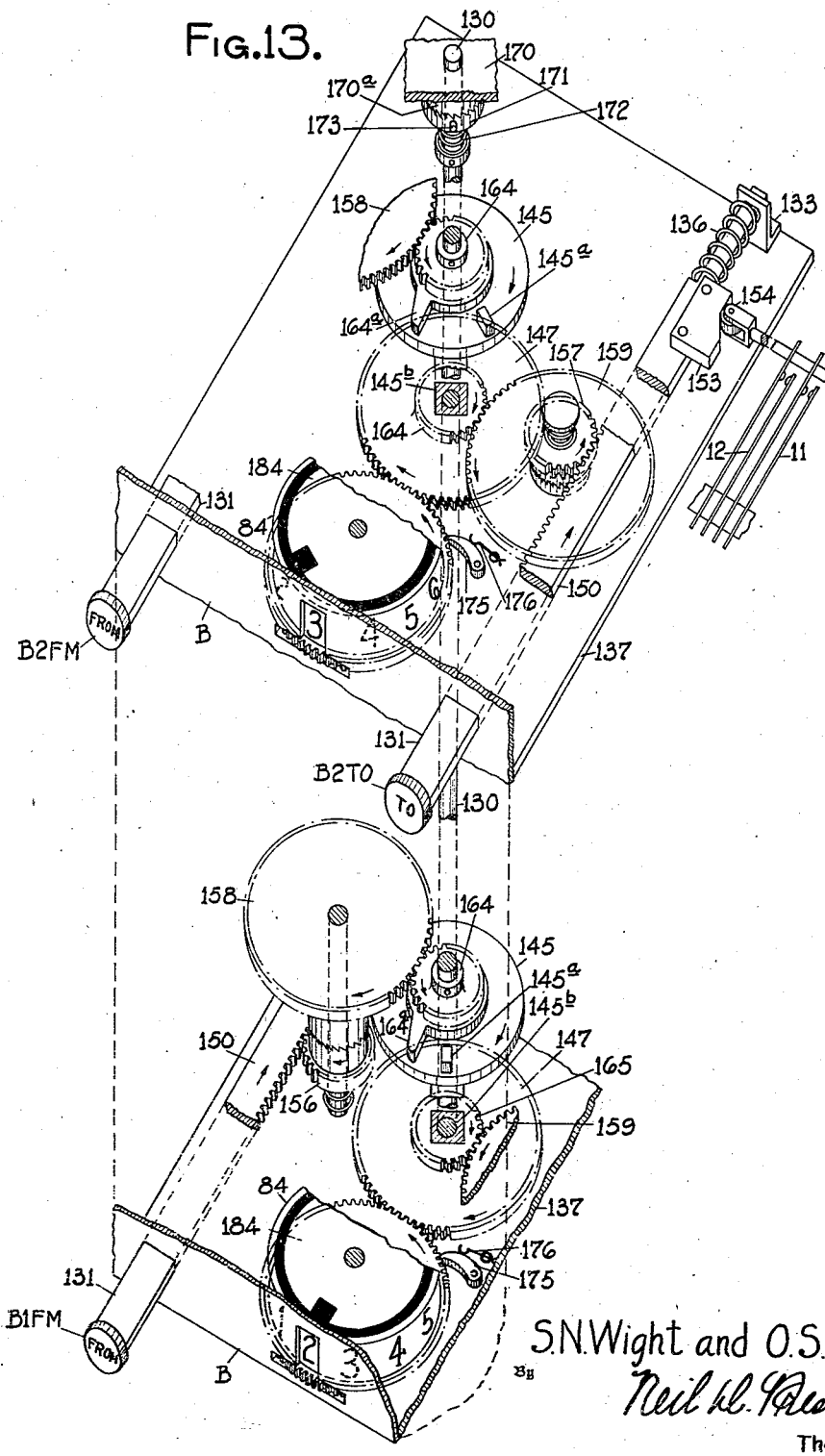

Patented Nov. 5, 1946

2,410,540

UNITED STATES PATENT OFFICE 2,410,540

AIRWAY TRAFFIC CONTROL SYSTEM

Sedgwick N. Wight and Oscar S. Field, Rochester, N. Y., assignors to General Railway Signal Company, Rochester, N. Y.

Application November 20, 1943, Serial No. 511,006

22 Claims. (Cl. 177—353)

This invention relates to airways traffic control systems or airplane dispatching systems, and more particularly to a system for displaying on a flight progress board authorized plane flights or authorized flight routes over various altitudes over a geographic route (route on the ground) and for displaying at each fix, check point or station a number identifying the airplane, the estimated arrival time and also displaying the time at which the airplane actually reaches or passes over such fix conveniently called the "over-report time," and which flight route may be cancelled by one man or by the cooperation of two different operators. This application is an improvement over our copending application, Ser. No. 489,774, filed June 5, 1943, now Patent No. 2,344,761, dated March 21, 1944; and the prior application of Wight, Field and Dicke, Ser. No. 500,672, filed August 31, 1943, now Patent No. 2,397,777, dated May 7, 1946. In railway signalling it is customary, practical and necessary for routes set up over certain railway tracks to be protected by interlocking so that trains cannot move on conflicting routes. This is an ideal and safe way of preventing trains from colliding with each other during their progress. By reason of the extremely high speed at which airplanes fly, and by reason of the fact that airplanes must either continue their flight or come to the ground, an entirely different problem presents itself in airplane dispatching which problem in certain respects is advantageous. The advantages reside in the fact that airplanes in flight fly at very high speeds and maintain their estimated schedule very closely and cannot come to rest on their flight route, and this enables their arrival times at certain destinations to be made much more certain than is true of railway trains that may stop on their route, and this makes the probability of conflict much lower.

In accordance with the present invention it is proposed to post or display by suitable posting units on a flight progress board, preferably of large dimensions and located a considerable distance away from the dispatcher, operator and over-reporter, the airplane or flight route identification, and its estimated arrival times at each of various fixes, check points or report stations along the ground route. Further, it is proposed to rely on the dispatcher and operator to give authority to airplane pilots to fly over certain designated ground routes at specified altitudes on different stretches thereof only if the estimated arrival time for other airplanes at conflicting fixes and altitudes as compared with the estimated arrival times of the airplane under consideration at such fixes is such as not to impose a hazard upon any of these airplanes. It is readily seen that in some instances airplane flight routes may be set up and displayed on the display board at the same fix and the same altitude at the same time if the arrival times for such airplanes are sufficiently different to preclude the possibility of a collision between such airplanes either at that fix or in adjacent territory extending say at least one-half the distance to the next adjacent fix.

In accordance with the present invention it is also proposed to employ an interlocked network of electrical route circuits for setting up on the flight progress board various airplane flight routes varying in altitude from fix to fix and to indicate on this flight progress board where a proposed route shall be established and to thereafter automatically, in accordance with contacts closed by a token identifying a particular airplane or flight route, project electrically this identification, expressed by a flight character or flight number of such airplane and of its token, into posting units at the particular altitude at each fix identified by such route circuit. This route network is the same as that shown in our above mentioned prior application except for additional features not hereinbefore disclosed. It is further proposed to provide a mechanical arrival time calculator for each control board which semi-automatically calculates and electrically manifests by the closing of particular contacts the arrival time for an airplane at each of various fixes on a proposed flight route as determined by setting of the starting time dial and the cruising speed dial for such airplane and to then project electrically to suitable posting units at the proper altitudes on the flight progress board the arrival times as calculated by such arrival time calculator. This calculator and associated apparatus is shown in both of the abovementioned prior applications and is for convenience omitted from this application except for the illustration of the "estimate" arrival time posting units shown in Fig. 2 and the direction calculator relays WETCR and EWTCR shown in Fig. 5M.

It is further proposed in accordance with the present invention to indicate the actual arrival time or over-report time on the flight progress board only if the airplane identification, altitude and fix as reported by the pilot to the over-report operator, the latter of which translates this report into specific manipulation, is in agreement with the airplane identification displayed by the airplane identification posting units of a route passing through such altitude for such fix. This structure may take the form as illustrated in either of the above mentioned applications and has for convenience been omitted except for the illustration of the "over" posting units shown in Fig. 2.

It is further proposed to cancel that portion of the airplane flight route to the rear of such token when such token after having been advanced is depressed.

It is also proposed in accordance with the present invention to employ a particular display board for each ground route. Since the various ground routes may, as at a crossing, have report stations or fixes in common, it will follow that the same report station may be represented by a panel on each of a plurality of boards, and in accordance with the present invention it is proposed to display the same indications for a common fix-posting located on each of a plurality of boards and to so interlock the route circuits that a particular display set up by the operator at a fix-posting on one board cannot be changed or disturbed by an operator of another board having that fix in common. This feature has for convenience not been disclosed herein but is disclosed in the prior applications Ser. Nos. 489,774 and 500,672, now Patents Nos. 2,344,761 and 2,397,777, respectively.

Since the system of the present invention employs many posting units each operable to a plurality of positions, and since these operations are caused by electrical manifestations impressed on a common multiwire bus structure, it is proposed to connect the lead-in wires of such posting units to the bus wires of the associated bus structure permanently. In order to avoid circuits within posting units which can connect two or more bus wires together, it is proposed to employ posting units which cannot create such run-around or sneak circuits by constructing them so that two lead-in wires are never connected together and so that a posting unit will operate until it reaches a deenergized bus wire. Such a posting unit will require all but one of the bus wires to be energized to electrically manifest the particular posting character of the deenergized wire. Since open circuits, due to accident, occur more easily than unauthorized closed circuits it is proposed to prevent a posting unit from being operated at all if any other bus energization than a one-wire-only deenergized condition exists, and apparatus to perform this function is proposed, has for convenience been omitted and is disclosed in the above mentioned Wight, Field and Dicke application Ser. No. 500,672.

Another object of the present invention resides in the provision of an indication bus in addition to a control bus for the airplane identification posting units, together with a set of conversion relays which will in response to the energization of one bus wire for a particular digit number of said indication bus cause all of the wires except that corresponding wire of the control bus to be energized. By this apparatus, it is possible to operate a second posting unit in accordance with the position assumed by a first posting unit.

It is also proposed as another object of the present invention, to provide apparatus for transposing a route already set up through a particular posting area of a particular fix to another posting area of such fix and to display the same information by the posting units of the posting area of the new route at such fix as were displayed by the posting units for the old route for that fix. In this connection it is proposed to provide a "from" and a "to" push button for each posting area on the control board and to provide apparatus to cause transposition to take place from the posting area where a "from" button is depressed to the posting area where the "to" button is depressed, providing they are located in the same fix.

In a modified form of the invention it is proposed to provide mechanical means for mechanically transposing the indication of altitude displayed on the manually operable altitude dials on the control board in response to manual operation of a "from" and a "to" push button on the same panel and to in turn cause the changed altitude to be displayed on the altitude posting unit on the flight progress board through suitable electrically operated repeating apparatus.

Other objects and purposes of the invention will in part be obvious and in part understood when the specification is considered in the light of the accompanying drawings, of which:

Fig. 1 shows the lower portion of the panels of fixes A, B and C of the control board;

Fig. 2 illustrates similar portions of the panels A, B and C of the flight progress board;

Figure 4:
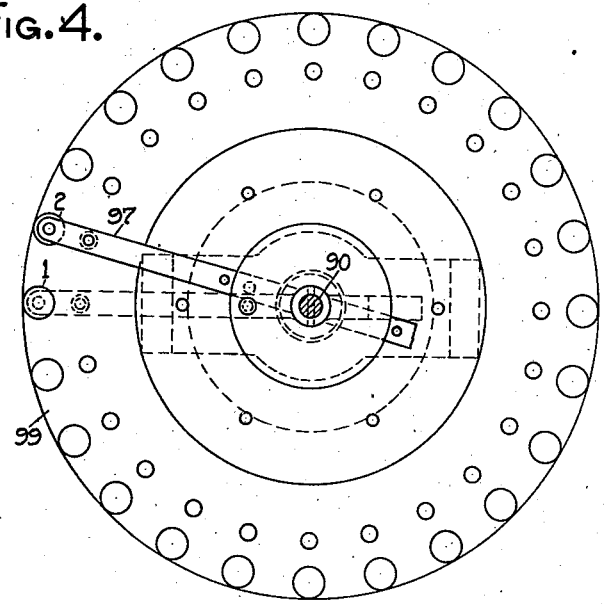
Fig. 4 shows a plan view of the rotary stick relay shown in Fig. 3.
Figure 5A:
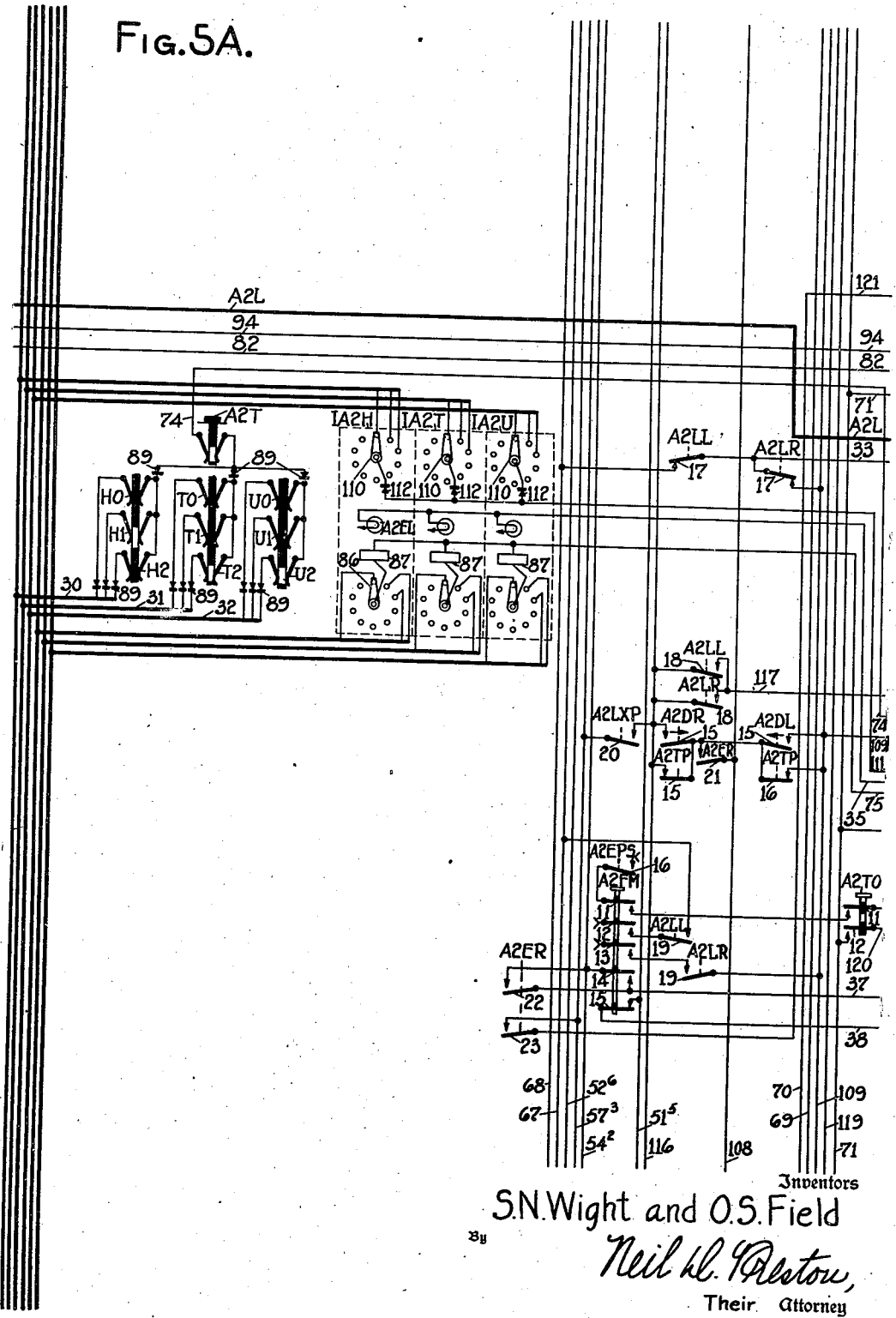

Figs. 5A–5M when assembled as shown in Fig. 6, illustrate the circuits interconnecting the various apparatuses illustrated in Figs. 1 to 4, inclusive, for establishing flight route circuits, of which the master apparatus is shown in Fig. 5M;

Fig. 6 illustrates how Figs. 5A–5M must be assembled to constitute the wiring diagram of the complete system;

Fig. 7 illustrates the circuits and apparatus whereby the altitude posting units shown in Fig. 2 may be controlled by their respective altitude dials shown in Fig. 1;

Figs. 8A, 8B and 8C illustrate the circuits (carved out of Figs. 5A–5M) which are involved in transposing a route passing through posting 1 of fix B to posting 2 of fix B, and vice versa;

Fig. 9 shows part of the panel B of a control board of modified construction, shown partly broken away to expose a portion of the mechanism thereof, for mechanically transposing the altitude indication from one posting to another when a "from" button at one posting is depressed followed by the depression of a "to" button at another posting on the same panel;

Fig. 10 illustrates a plan view of the mechanism for posting 2 of the apparatus shown in Fig. 9;

Fig. 11 is a sectional elevation taken on the line 11—11 of Fig. 10, as viewed in the direction of the arrows;

Fig. 12 is a sectional elevation taken on the line 12—12 of Fig. 10, as viewed in the direction of the arrows; and Fig. 13 shows an exploded isometric view of the mechanical transposing apparatus associated with the "from" button for posting 1 and a portion of the transposing apparatus associated with the "to" button for posting 2 of panel B.

Structure

*Controller's board.*—In Fig. 1 has been illustrated a portion of the control board showing the lower portion of each of the control panels for fixes A, B and C, the corresponding portion of the arrival time calculators disclosed in the above mentioned prior applications for calculating west-to-east arrival time and calculating east-to-west arrival time having, for convenience, been omitted. Referring to panel B of the control board (see Fig. 1), the left-hand column of push buttons including push buttons B1LX and B2LX constitute the exit buttons for establishing routes from left to right from fix A toward fix B and constitute the entrance push buttons for establishing routes extending toward the left from fix B to fix A; whereas the push buttons in the right-hand column and including push buttons B1RX and B2RX are entrance push buttons for extending routes from fix B to fix C and also constitute the exit push buttons for establishing routes from fix C to fix B. The numerals 1 to 3 inclusive on panel A constitute the numeral designations of postings (there preferably being a total of twenty-four or more postings), whereas the numerals 2, 2, 3 for fix A, numerals 2, 3, 3 for fix B, and numerals 2, 3, 4 for fix C illustrate that these postings or flight authorizations may exist in altitudes 2000, 2000 and 3000 feet for fix A, 2000, 3000 and 3000 for fix B, and 2000, 3000 and 4000 for fix C, respectively, sixteen different altitudes (2–17) being contemplated. In other words, these various numerals for panel A indicate that the 2000 foot altitude may be occupied by airplanes authorized by postings or flight authorizations 1 and 2, that the 3000 foot altitude may be occupied by airplanes flying on routes authorized by posting 3. For panel B the postings, by the adjusted positions of their altitude dials, are differently distributed among the altitudes. That is, the altitude dials on panel B are set to signify the airplane posted in posting 1 as flying at the 2000 foot altitude and the airplanes posted in postings 2 and 3 as flying at the 3000 foot altitude. It should be understood that the altitude dials on the control boards are by rotation readily changeable and that the altitude assignment for the various postings may be changed easily, corresponding changes of altitude assignment being made on the flight progress boards by operation of the electrically operated altitude posting units shown on the flight progress board so that the altitude assignments on the control board and its flight progress board are at all times in agreement.

Referring again to panel A of the operator's control board (Fig. 1) the two left-hand columns of lamps including the lamps A1WQL and A1WQR are employed to signify when energized that a flight route either to or from the next fix to the left of fix A has been set up, that is, the reference characters by the letters "L" and "R" therein signify left and right direction of traffic respectively. Similarly, the indicating lamps in the two right-hand rows including the lamps A1EQL and A1EQR when lighted signify that a flight route from fix A to fix B or from fix B to fix A respectively has been either tentatively or actually established, the arrows in each bull's eye, and only visible when lighted, signifying the directions in which airplanes may fly over such flight routes. Obviously, if a lamp in a "W" column and also in an "E" column for a particular posting in fix A is illuminated, their arrows of course pointing in the same direction, indicates that an airplane flight route through the fix A at the altitude signified by the altitude dial for such posting has been set up; whereas if only one of these lamps is lighted signifies that the flight route either starts or finishes at that fix.

What has been said in regard to fix A is likewise true of fixes B and C, where like reference characters are employed except that the letters B and C respectively have been substituted for the letter A. What has been said in regard to the lamps for posting 1 is also true for lamps of other postings of the same fix which are assigned like reference characters except for the posting numeral (see Figs. 1 and 5A–5L). Similar direction lamps designated by like reference characters except that "K" has been substituted for "Q" are employed on the flight progress board (see Figs. 2 and 5A–5L).

The west-to-east calculator and the east-to-west calculator have been fully disclosed and described in the prior application of Wight and Field, Ser. No. 470,018, filed December 24, 1942, and the functions performed by these calculators have been clearly disclosed in the applications, Ser. Nos. 489,774 and 500,672, above referred to, for which reason this calculator has not been shown and will not be further discussed.

Each of the posting areas for each fix of the control board (Fig. 1) is also provided with a receptacle for receiving a token, conveniently called a token jack. These token jacks are designated A1T, A2T, etc. (also shown in Figs. 5A–5L) where "A" represents the fix, the numeral represents the posting area on the control board, and where "T" stands for "token." These tokens are provided with token plates which may have suitable data written thereon, such as the pilot's name, the type of airplane, the kind of cargo, its final destination, etc. One such token 122T has been shown in token jack A2T in Fig. 1 of the drawings and represents the airplane 122 which is to fly over the proposed route passing through this posting-fix. These token jacks are provided with a large number of contacts some of which are closed when any token is inserted therein, whereas others are closed only by certain tokens to electrically characterize the identifying character of the token and still others are closed or opened only when the token jack is depressed. Some of these token jack contacts are shown in Figs. 5A–5L of the drawings. These token jacks are constructed to be depressable and the contacts which are closed or opened when a jack is depressed function the same either with or without a token therein. For a more detailed illustration and description of these tokens and jacks, attention is directed to the joint application of Wight and Field, Ser. No. 489,775, filed June 5, 1943.

Each control panel is provided with a column, marked "Altitude," of altitude indicators or dials. Each of these indicators comprises a rotatable dial on which the altitudes are indicated by numerals of which only one numeral is fully visible at any one time, as shown in Fig. 1. Each of these altitude dials is also provided with a contact drum which makes the necessary electrical connections to operate the corresponding altitude posting unit located on the flight progress board (see Fig. 2) to a position to indicate the same altitude. Since these altitude posting units each have their clutch coils 87 connected by a rotary contact arm 86 to the lead-in wires one at a time, they must be controlled by energization of all of the lead-in wires except the wire corresponding to the number which is to be displayed. That is, all but one of the lead-in control wires (see Fig. 7) are at all times connected to the plus terminal of a source of current as a result of which the posting unit is operated to a position where the contact arm 86 engages the deenergized lead-in wire.

Referring to Fig. 7 the altitude posting unit shown therein is of a construction as shown in our prior application, Ser. No. 489,776, now Patent No. 2,378,294 dated June 12, 1945, except that the contact mechanism for connecting the lead-in wires to the clutch coil is such as to connect the lead-in wires to such clutch coil one at a time only. The altitude dial 84 on the control board (see Fig. 7) is preferably provided around the lower edge with V-shaped notches 84a which may be engaged by the detent spring 85, one at a time. These notches and detent springs are provided to assure against displacement of the dial due to vibration, or the like. The manner in which this control board (Fig. 1) may control the posting units and arrow lights on the flight progress board (Fig. 2) through the medium of the circuits shown in Figs. 5A–5M will be pointed out in the complete operation hereinafter.

*Over-report pedestal.*—An over-report pedestal is preferably provided for each control board, such pedestals and their control panels are shown in each of the applications, Ser. Nos. 489,774 and 500,672, above referred to, and will for convenience be omitted from this application.

*Flight progress board.*—A portion of each of the panels A, B and C of the flight progress board FPB have been illustrated in Fig. 2 of the drawings. It will be observed that in the first column from the left-hand side of panel A, as evidenced by the numerals 1 to 3, the various postings or airplane flight authorizations that may be displayed for fix A on the flight progress board have been indicated. It will also be observed that the posting units displaying numbers 2, 2 and 3 shown adjacent these posting numbers signify altitudes as is evident from the caption "Altitudes," and these numbers indicate the altitude assigned to the airplane and are displayed in these postings of fix A.

Referring again to panel A for fix A on the flight progress board FPB (see Fig. 2) the left-hand column of double row of lamps including indicating lamps A1WKL and A2WKL each, when illuminated, display an arrow pointing to the left and that the next column of lamps including lamps A1WKR and A2WKR are each provided with an arrow pointing to the right, which arrow is visible only when the lamp is illuminated. Similar lamps are provided for the right-hand double column of lamps which have been designated by like reference characters except that E has been substituted for W. Similar indicating lamps are provided for each of the other fixes and are designated by like reference characters except that the proper fix letter is substituted for the letter "A." Each of these arrows, when the associated lamps are lighted, manifest that a flight route to or from such fix in the direction as indicated by the arrow has been set up. It should be observed that in the reference characters for these arrow lamps the first letter denotes the fix, the number denotes the posting, the second letter denotes the side, whether east or west, the letter "K" denotes flight progress board, and the last letter R or L denotes the direction of travel, that is, right or left. The reference characters assigned to these lamps are the same as those assigned to corresponding lamps on the control board except that on the flight progress board the letter "K" has been substituted for the letter "Q."

Referring again to panel A (see Fig. 2) there are three columns of changeable exhibitor indicators or posting units, each column of which is capable of displaying multiple digit numbers. The first column headed "identity" has sufficient posting units to display three digit numbers signifying the identity of the airplane, the second column headed "estimate" has sufficient posting units to indicate four digit numbers signifying the hours and minutes of estimated arrival time, and the third column headed "over" has only sufficient posting units to display two digit numbers signifying the actual arrival time of an airplane over that fix expressed in minutes. These changeable exhibitor indicators or posting units may be of a construction such as shown in Figs. 7 to 10 of the copending application of Wight and Field, Ser. No. 470,018, filed December 24, 1942, or may be of a construction such as illustrated in the copending application of Wight and Field, Ser. No. 489,776, filed June 5, 1943, now Patent No. 2,378,294 dated June 12, 1945, except for the provision of contact mechanisms which as shown in Figs. 5A–5L and 7 includes a rotary contact 86 which connects the clutch coil 87 to to the lead-in wires one at a time only.

*Token and token receptacle.*—The token receptacles, conveniently called token jacks, employed are shown conventionally in Figs. 5A–5L of the drawings, whereas token 122T is shown in Fig. 1 of the drawings and is also shown conventionally in token jack A2T in Figs. 5A and 5B of the drawings. Referring to Figs. 5G, 5A, 5I, 5C, 5K and 5E of the drawings it will be observed that a portion of each of the token jacks A1T, A2T, B1T, B2T, C1T and C2T have been illustrated respectively therein and that a token 122T has been shown inserted in the token jack A2T. It should be observed that these same token jacks are respectively shown in Figs. 5H, 5B, 5J, 5D, 5L and 5F. In other words, a part of the same token jack is shown in each pair of adjacent sheets 5A—5B, 5C—5D, 5E—5F, 5G—5H, 5I—5J and 5K—5L. As illustrated in Fig. 5A of the drawings the token jack A2T shows having associated therewith only two contacts, of which contacts 11 are closed only when the token is fully inserted therein and of which contacts 12 are opened when the token and its jack, or the jack alone, are depressed. There is also a contact 13 for this token jack A2T but it is shown in the lower right-hand corner of Fig. 5B and is closed only when the token jack A2T is depressed. The corresponding contacts of other token jacks are similarly identified.

In addition to the contacts already mentioned there are 30 other contacts, namely, 10 in each column H, T and U (see Fig. 5A), signifying hundreds, tens, and units, respectively, of which only one in each column is closed by insertion of a token in the jack and irrespective of whether the token and its jack are depressed or not. Of these 30 contacts, 9 contacts only have been illustrated in the left-hand side of Fig. 5A of the drawings, 3 contacts having been illustrated in each of the hundreds column H, the tens column T, and the units column U, the contacts in each column having been designated 0, 1 and 2 successively. It should be understood that there are 10 such contacts in each digit column and for future reference purposes the three contacts for the columns will be designated H0, H1, H2, etc.; T0, T1, T2, etc.; and U0, U1, U2, etc. Although the 30 contacts just mentioned, which are used for airplane identification purposes, are illustrated as being arranged in three columns one column for each digit, these contacts are actually, in practice, arranged in two columns, there being 15 such contacts in each column. This is done to permit a narrower and longer token to be employed and is advantageous by reason of the limited space on the face of the operator's control board available, see application of Wight and Field, Ser. No. 489,775, filed June 5, 1943.

Each of the tokens is provided with three actuating lugs each of which can close a particular airplane identification contact in a particular digit and these lugs are arranged differently on each of the tokens so that various airplane identification number from 1 to 999 may be characterized by these various tokens. For instance, token number 122T would be constructed to close contact 1 in column H (see left side of Fig. 5A) and to close the contacts 2 in both the tens column T and the units column U. By properly distributing the lugs in each of these tokens, numbers from 1 to 999 may be electrically manifested or characterized. The token jack contacts such as 11, 12 and 13 are actuated by any token and no lugs or notches are required to cause such actuation. For a more detailed illustration and more detailed description of these tokens and token jacks, attention is directed to the copending application of Wight and Field, Ser. No. 489,775, filed June 5, 1943. It will be observed that a half-wave rectifier 89 is included in series with each of the three lead-in wires leading to the token jacks. These rectifiers are employed to allow current to flow only toward buses or cables 30, 31 and 32 and thereby prevent the establishment of run-around or sneak circuits.

*Posting units.*—Referring to Fig. 5A of the drawings and to the panel A shown on Fig. 2 of the drawings, it will be observed that the three indicators for indicating airplane identification at posting 2 and located in the column "identity" (Fig. 2) have been designated IA2H, IA2T and IA2U. These posting units are used for indicating the hundreds, tens and units digit of the airplane identifying number. Similarly, indicators or posting units are provided in the column headed "estimate" to indicate the tens of hours, units of hours, tens of minutes, and units of minutes of estimated arrival time, respectively, but these posting units and their control circuits have been omitted from Figs. 5A–5L of the drawings. Similar posting units for indicating over-report time are provided in the third column of the panel A of the flight progress board FPB and headed "over" in Fig. 2. These posting units are used for indicating the over-report time in minutes and have with their control circuits for convenience been omitted from Figs. 5A–5L of the drawings. These movable indicator posting units may be of a construction such as illustrated in Figs. 7 to 10, inclusive, of the prior application of Wight and Field, Ser. No. 470,018 or may be of a construction such as indicated in our copending application, Ser. No. 489,776, filed June 5, 1943, except for the changed construction including the rotary contact arm 86 which connects the lead-in wires to the clutch coil 87 only one at a time.

Generally speaking, these posting units constitute a rotatable belt or drum of translucent material on the inside of which the numerals are painted or otherwise affixed, there being an indicating lamp such as A1EL or A2EL (see Figs. 5G and 5A) for rendering these numerals visible only when such lamp is illuminated. The construction is such that the lamps are illuminated only when the number displayed by such drum or belt is to be rendered visible. The construction is further such as to provide a plurality of lead-in wires to each posting unit to actuate the same by suitable power operating means and including means for opening the energizing circuit for such power operating means at the proper position of such drum. The construction of the posting units of this application differs from that of the posting units of our application, Ser. No. 489,776, above referred to in that, as shown, only one lead-in wire at a time is connected to the clutch coil 87. Also, to display a new indication all but one of such lead-in wires must be energized to in turn cause the drum or belt to be rotated to a position to display a number corresponding to the number of the wire then deenergized. In other words, if wire No. 5 is deenergized and all other wires are energized, the rotatable drum or belt will be operated by the power operating means 87 until the numeral 5 is displayed by the posting unit, at which point in the operation of the unit the energizing circuit for the power operating means is opened and the rotatable belt or drum is suddenly brought to stop by a spring pressed electro-magnetically operated brake or detent. For a detailed description of the construction and operation of these movable indicator posting units, except for the modification in the structure above pointed out, attention is directed to the above mentioned copending applications. These applications show the structure except that the lead-in wires of the posting units in this application are connected to the clutch magnet 87 one at a time in non-overlapped relation. This may be done by arranging stationary contacts in a circle, as shown, where a lead-in wire is connected to each contact and where a rotary contact arm 86, rotating with such drum, and engaging these contacts, one at a time, is directly connected to the clutch magnet coil 87 (see Figs. 5A–5L).

*Indicating lamps.*—As already pointed out, indicating lamps such as A1WQL, A1WQR, A2WQL and A2WQR (see Figs. 1, 5A and 5G of the drawings) are employed on the controller's board. These lamps indicate whether a flight route has been established up to that fix or has been established through that fix, the arrows indicating the direction of the flight route. Similar arrow display indicating lamps such as A1WKL, A1WKR, A2WKL and A2WKR are provided on the flight progress board. Corresponding lamps, such as A1WQL and A1WKL are connected in multiple. In addition to these indicating lamps there are provided lamps, such as B1EL (see Figs. 5A–5L), which have been mentioned above. These lamps light corresponding posting units for displaying the airplane identification on corresponding portions of the flight progress board. These latter lamps will only be lighted when the numerals displayed by these posting units are to be recognized on the flight progress board, these numerals on the posting units being invisible so long as the lamps associated therewith are extinguished.

*Arrival time calculator.*—The estimated arrival time calculators include a series of differential or epicyclic gear units through the medium of which a shaft may be driven by several other shafts, these units being located in the desk (not shown) constituting part of the control board, there being three such gear units in the control board CB for each fix for each direction of calculation. The west-to-east arrival time calculator is preferably located underneath the front part of the desk. The west-to-east calculator has been shown in detail in Figs. 1, 2 and 3 of the prior copending application of Wight and Field, Ser. No. 470,018, to which attention is directed.

Figure 3:
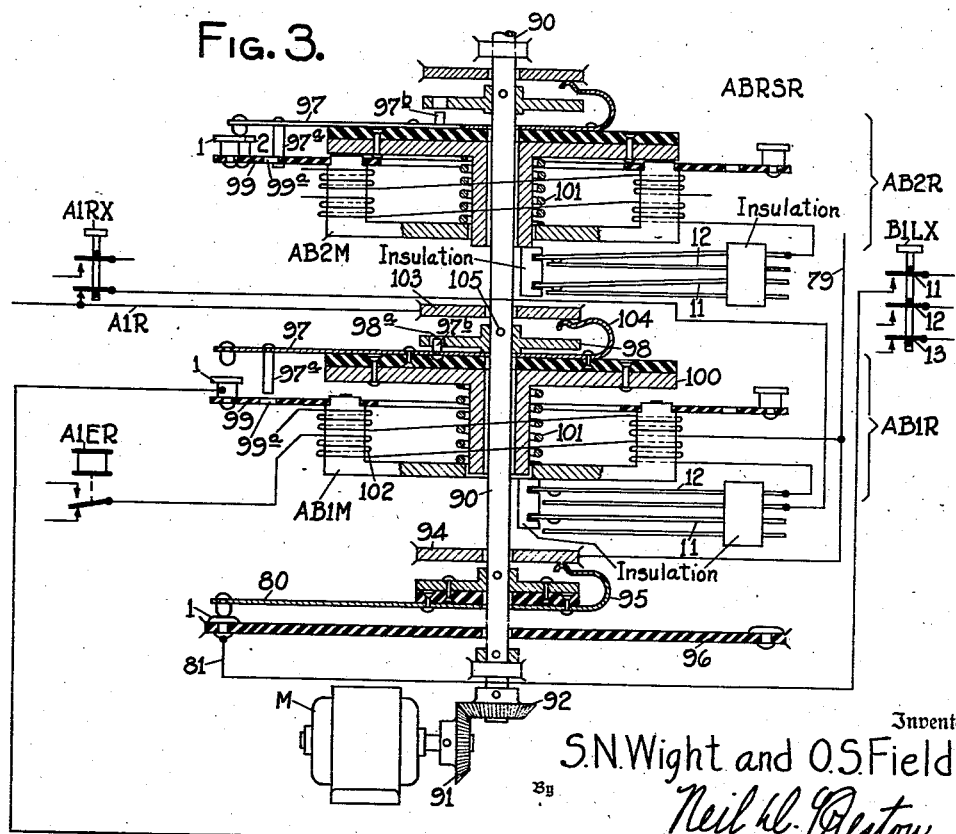
Fig. 3 illustrates a side elevation, shown partly in cross-section, of a compound rotary stick relay structure, which has some operating characteristics similar to those of an electrical scanner.

*Rotary stick relays.*—In Figs. 3 and 4 has been illustrated structurally a portion of the rotary stick relay ABRSR shown conventionally in Figs. 5B and 5H of the drawings. The lower end of a similar stick relay BCRSR is shown conventionally in the lower right-hand corner of Fig. 5J of the drawings. Referring to Fig. 3, this rotary stick relay ABRSR comprises a vertical shaft 90 which is preferably continuously driven by a motor M through the medium of bevel gears 91 and 92. This vertical shaft 90 is long enough to accommodate as many rotary stick relay units as there are postings in the fix next to the left of the section in which such rotary stick is located, say twenty-four. The rotary stick relay ABRSR is associated with the section AB connecting the fixes A and B. Each of the rotary stick relay units forming part of this rotary stick relay is provided with an electro-magnet such as AB1M for posting 1 section AB conveniently called a clutch magnet. The unit for posting 1 of the rotary stick relay has been designated AB1R, whereas other rotary stick units are similarly designated, where the first two letters designate the section joining the two fixes to which such units are assigned and of which the numeral designates the posting in the fix next to the left of such rotary stick relay unit. At the extreme lower end of the shaft 90 is provided a seeker switch including a rotary contact arm 80, which arm sequentially engages stationary contacts 1, 2, 3, etc., where these contact numbers correspond to the postings of the fix next to the right of the section in which such rotary stick relay is located. This seeker switch sequentially connects the wire 79 with the vertical bus wires 1, 2, 3, 4, respectively connected to the left-hand push button of corresponding postings of the fix next to the right. As shown in Figs. 3 and 5H this wire 79 is connected to the right-hand terminal of the upper winding of the rotary stick relay magnets for all of the posting for the fix next to the left of the section in which such rotary stick relay is located.

From this construction it is readily seen that when the shaft 90 assumes a position where the seeking contact arm 80 engages a particular energized stationary contact the particular rotary stick relay clutch magnet which then has its left-hand terminal of its upper winding connected to the proper terminal of a source of current will be energized to thereby uncouple the rotary arm of such rotary stick unit from the shaft 90 and couple it to the stationary plate 99, all in a manner as more clearly pointed out hereinafter.

In this connection it should be observed that the wire 79 is connected to a slip ring 94 which in turn is connected to the rotary contact arm 80 through the medium of a spring contact brush 95.

Each rotary stick relay unit is provided with a rotary contact arm 97 which is, however, normally out of engagement with its associated stationary contacts. These rotary arms 97 are provided with locking pins 97$^a$ and 97$^b$. The lock pin 97$^b$ of the unit AB1R normally engages a hole 98$^a$ in the collar or circular metallic plate 98 whereas the lock pin 97$^a$ upon energization of the clutch magnet AB1M engages a hole 99$^a$ in the insulating disc 99, which hole corresponds to the contact 1, 2 or 3, as the case may be, engaged by the rotary arm 80 through which arm 80 the current for energizing the magnet AB1M may flow. In this connection it should be observed that the rotary arm 97 is carried by, but insulated from, an armature 100. This armature 100 is freely mounted upon the shaft 90 but is held in raised position by a coil spring 101, the lower end of this coil spring 101 resting upon the stationary iron core 102 of the electro-magnet AB1M. The stationary insulating disc 99 is provided with similar contacts 1, 2, 3 etc. which are preferably in radial alignment with correspondingly numbered contacts 1, 2, 3, contained on the stationary insulating discs 96. It should be observed that the rotary contact arm 97 is connected to the wire AIR through the medium of a slip ring 103, the connection between the contact arm 97 and the slip ring 103 being made through the medium of a metallic contact brush 104.

The circular metallic plate 98 is suitably pinned to the shaft 90 as by a pin 105, this plate being provided with a single hole 98$^a$ for receiving the pin 97$^b$. It should be observed that the pins 97$^a$ and 97$^b$ are of such length that they cannot both be disengaged at the same time. In other words, upon energization of the electromagnetic clutch AB1M the stop pin 97$^a$ must first engage the particular hole 99$^a$ in plate 99 corresponding to the fixed contact then engaged by brush 30 before the pin 97$^b$ can disengage from the hole 98$^a$ in the metallic plate 98. Similarly upon deenergization of this magnet AB1M the pin 97$^a$ cannot disengage from the particular hole 99$^a$ in plate 99, in which it is then located, until the rotating shaft 90 has brought the hole 98$^a$ directly over the pin 97$^b$. In other words the rotary contact 97 is resynchronized with the rotary contact 80 upon deenergization of the magnet AB1M.

The electro-magnetic clutch structure AB1M also performs the function of a stick relay in that it is provided with a stick contact 12 for holding the lower winding of this magnet energized after current is removed from the wire 79 as it will be upon continued rotation of shaft 90 after pin 97$^b$ has been disengaged from plate 98. This electro-magnet is also provided with front contacts 11 which perform specific functions more particularly described hereinafter.

From the foregoing description of the rotary stick relay and its individual stick relay units it is readily observed that upon application of energy to one of the stationary contacts of the seeker switch mechanism from one terminal of a source of current at a time when the left-hand terminal of the upper winding of an associated clutch magnet is connected to the other terminal of such source that that particular clutch magnet will be energized the first time the shaft 90 and its associated rotary contact 97 assumes the position where contact 80 engages an energized stationary contact. The energization of such clutch magnet and the movement downward of the armature 100 against the spring 101 will cause the pin 97$^a$ to engage the proper opening 99$^a$ in the plate 99 after which the pin 97$^b$ disengages from the collar 98 and allows continued rotation of the shaft 90. This is the case even though the rotary contact 97 of that particular rotary stick relay unit has been brought to rest at a point corresponding to a wire of the rotary seeker switch which was then energized. As soon as the armature 100 is moved downward it closes the contacts 11 and 12 for that particular rotary stick relay unit and since the contact 12 constitutes a stick contact for this clutch magnet that particular rotary stick relay unit will be maintained in its stationary selected and energized position through the medium of a stick circuit including such stick contact 12 and the lower winding of that magnet. This unit will of course remain in this condition until this stick circuit is broken at another point. It is thus seen that a structure has been provided for controlling a plurality of rotary stick relay units through the medium of a single seeker rotary switch and that each of these units may close a large number of specific circuits one at a time, the specific circuits closed by the various rotary stick relay units including rotary contacts 97 assuming various radial positions when in stuck-up positions even though they assume the same radial position with respect to the shaft 90 when in their normal non-energized positions.

*Posting apparatus.*—As hereinbefore pointed out electrical apparatus is provided for transferring the airplane identification numbers, characterized by a token, and the estimated arrival time numbers, characterized by contact mechanisms controlled by the arrival time calculator, into the posting units of the columns "identity" and "estimate," respectively, in response to the depression of the token and a directional transfer button. If only the identification number is to be transferred a single push button will suffice. The apparatus for transferring estimated arrival time, of course, being omitted for reasons heretofore given.

Attention is now directed to the transfer apparatus shown in the upper right-hand corner of Fig. 5M of the drawings. This transfer apparatus includes a master posting relay MPR, a master series relay MCPR, a master series repeater relay MCPRP, and directional transfer buttons METB and EWTB and their associated repeater relays WETBR and EWTBR.

*Conversion relays.*—As more fully pointed out hereinafter the posting units for posting airplane identity are each controlled by energizing all but one of the lead-in wires from wires within a cable but if the position of a posting unit is desired to be electrically manifested this is accomplished by electrical energy flowing only from one of the posting unit lead-in wires to such cable. It is thus seen that if the electrical manifestation of the position assumed by a posting unit is to be reposted somewhere else, as when postings are to be interchanged or transposed, it will be necessary to convert the one-wire-only energized condition of the posting indicator cables 30, 31 and 32 into a one-wire-only deenergized condition of the control cables 40, 41 and 42. That is, for each bus wire of the indicator cable 30 which is energized the corresponding bus wire of the corresponding control cable 40 must be held deenergized; whereas, all other wires of such corresponding control cable 40 must be held energized. That is, for each wire exclusive of the one wire which is energized of a particular indicator cable, such as cable 30, there must be an energized wire in the corresponding control cable, such as cable 40, in order that the posting unit to be operated will be operated to a corresponding position as that assumed by the original posting unit in case of transposition or as that characterized by the token jack in case of original posting. For this reason, conversion relays are provided, which are illustrated in Fig. 5M of the drawings.

By referring to the conversion relays in Fig. 5M of the drawings, it will be observed that the conversion relay HR0 of this board is picked up by energy derived over the "zero" wire of the indication cable designated 30 and by picking up applies energy to all of the wires of the control cable 40 corresponding to the remaining nine wires 1 to 9 of the indication cable 30. Similarly, it will be observed that the relay HR1 is picked up in response to energy on wire "one" of cable 30 and that the picking up of this relay HR1 applies energy to all of the wires of control cable 40 corresponding to the remaining nine wires 2 to 0 of the indication cable 30. Similarly, the relay HR2 is energized from the "two" wire of the cable designated 30 and by picking up applies energy to each of the corresponding remaining nine wires 3 to 1 of the control cable 40. In a similar manner the relays TR0, TR1 and TR2 and relays UR0, UR1 and UR2, and all of the other conversion relays similarly apply energy to each of the wires of the control cable belonging to that digit except the particular wire which corresponds to the wire that was energized to pick up such relay. It is thus seen that the expression "conversion relays" is significant in that it converts the one-wire-only energized condition of the indication cable into a one-wire-only deenergized condition of the corresponding control cable.

*Altitude posting unit control.*—As already pointed out the altitude posting units in the column Altitudes on the flight progress board FPB (Fig. 2) are individually controlled by their respective altitude dials located in the column Altitudes on the control board CB (Fig. 1). It is readily seen (Fig. 7) that for any position of the altitude dial 84 where the spring detent 85 is in a notch 84ª the clutch magnet 87 of the associated altitude posting unit will be energized to cause rotation of the contact arm 86 until the contact arm 86 encounters a deenergized wire, namely, until such posting unit displays the same indication as is then displayed by such altitude dial.

*Posting interlocking network.*—The posting interlocking network is substantially entirely shown in Figs. 5B, 5D, 5F, 5H, 5J and 5L of the drawings and is almost wholly controlled from the operator's control board and is used to establish flight route circuits. This route network is very similar to the route network shown in our prior application, Ser. No. 489,774, where this network has been shown isolated from the posting unit control circuits. Each route circuit electrically identifies one posting area in each of a plurality of fixes on the control board and one posting area in each of a plurality of fixes on the flight progress board. These flight route circuits are controlled by the push buttons of control areas on the control board and control indicating lamps located in corresponding posting areas on both the control board and the flight progress board. They may, however, be transposed to other postings of the same fixes by "from" and "to" buttons.

These route circuits conform substantially, that is, rise and fall in the same way as the actual flight routes rise and fall in passing through the altitudes involved over the ground route defined by that control board and indicated by the associated flight progress board when postings are made strictly in accordance with altitudes. Figs. 5H and 5B show respectively the postings 1 and 2 of the network for fix A, whereas Figs. 5J and 5D show respectively postings 1 and 2 of the network for fix B. Similarly, Figs. 5L and 5F show respectively postings 1 and 2 of the network for fix C. It is desired to point out here that the apparatus and circuits in the three groups of Figs. 5A, 5B, 5G, 5H, Figs. 5C, 5D, 5I, 5J, and Figs. 5E, 5F, 5K, 5L are identical, and show corresponding apparatuses for fixes A, B and C respectively.

It will be observed that each posting of the network is provided with two link wires. For posting 1 of fix A these link wires have been designated A1L and A1R and are electrically connected together only if a route circuit extending through the network of that posting has been established. In the reference character A1L the first character denotes the fix "A," the second the posting "1," and the third the direction "left" and other link wires are similarly designated. If the route circuit in question starts at a particular posting, say posting 2 of fix A, the link wire A2R receives its energy through the front contact of the associated token repeating relay, such as front contact 13 of token repeating relay A2TP. Any one right-hand link wire for fix A can be connected to any left-hand link wire for fix B through the vertical bus wires 1 to 3, etc., of the altitude bus illustrated on the right-hand side of Fig. 5B. Any right-hand link wire of fix B can be connected to any left-hand link wire of fix C through the medium of similar altitude bus wires shown at the extreme right-hand end of Figs. 5J and 5D of the drawings. When a route is set up from left to right current flows from left to right from link wire to link wire and it flows from right to left if the route has been set up from right to left.

The connections for connecting any particular right-hand link wire of fix A to any particular left-hand link wire of fix B is carried out through altitude bus wires numbered 1 to 3, etc., inclusive, and these altitude wires are selected through the medium of rotary stick relay units (see Figs. 3 and 4). There is such a rotary stick relay unit for each posting-fix. The manner in which these rotary stick relay units are rotated and picked up, that is, whether they are picked up in one rotated position or another is determined for section AB, for instance, by the particular push button BLX depressed at fix B, whereas the particular rotary stick relay unit controlled, that is, whether for posting 1 or posting 2 of fix A is determined by the particular push button ARX depressed at fix A. The rotary selecting contact 97 for posting 2 fix A section AB is shown on shaft 90 in Fig. 5B, whereas the seeker contact 80 is shown in this same shaft 90 but at the bottom of in Fig. 5H. As illustrated only three altitude bus wires are shown and this would take care of only three different postings at each fix. Since it is contemplated to employ 24 or more postings at each fix these altitude bus wires would have to be increased at least to 24, as will be obvious to any one skilled in the art. It is contemplated that the shaft 90 will rotate at about one revolution per second which is not deemed too fast if 24 contacts and altitude bus wires are employed. It is thus seen that any push button toward the left from any section (such as section AB) selects a particular, namely, the associated rotary stick relay unit; whereas, any push button in the fix toward the right of such section determines the rotated position of the selecting contact 97 when the circuit for the associated magnet is closed. The particular altitude bus wire the contact 12 of the push button to the right of the section is connected to, such as push button B1LX (Fig. 6B) for section A—B, determines the rotated position of selecting contact 97 of the selected unit, such as AB2R, and in turn determines the link wire to be selected.

Each posting is provided with a token receptacle or token jack, such as A1T or A2T (Figs. 5H and 5B) directly below which is shown its associated token repeating relay A1TP or A2TP. To the left of each token repeating relay is shown the right direction relay DR and to the right of each token repeating relay is shown a left direction relay DL. These direction relays have been designated A1DR, A1DL, A2DR, A2DL, B1DR, B1DL, B2DR, B2DL, C1DR, C1DL, C2DR and C2DL.

Directly to the left of each right direction relay, such as relay A1DR, is shown the push button repeating relay A1LL, whereas directly to the right of the left direction relay A1DL is shown the push button repeater relay A1LR. Similarly designated push button relays are provided at other fix-postings. The push button repeating relay A1LL is directly associated with the push button A1LX, whereas the push button repeating relay A1LR is indirectly associated with the push button A1RX through the medium of the associated rotary stick relay unit AB1R shown to the right thereof. The relay A1LR in order to be picked up requires clutch magnet AB1M of the associated rotary stick relay unit AB1R to be up. The clutch magnet AB1M is picked up by a circuit passing through the push contact 12 of the associated push button A1RX and the back contact 13 of its associated push button repeating relay A1LR. The reference characters for the various relays just mentioned include prefixes which designate the fix and the posting with which they are associated.

It may be pointed out that the push button repeating relays A1LL and A1LR in combination with their respective direction relays A1DR and A1DL control the indicating lamps A1WQR, A1WQL, A1EQR and A1EQL located on the control board and control the direction indicating lights A1WKR, A1WKL, A1EKR and A1EKL located on the flight progress board. This is accomplished through the medium of contacts 16 and 14 of the associated push button repeating and direction relays respectively. Similarly numbered contacts are provided at the other fix-postings.

Referring to posting 2 for fix A (Fig. 5A) it will be observed that if token 122T, for instance, is inserted in token receptacle A2T, as shown, that the token repeating relay A2TP will be energized and picked up, and that current may then flow from the positive terminal of the main network battery through the inductance 107, back contact 13 of the push button repeating relay A2LL and front contact 13 of token repeating relay A2TP to the associated link wire A2R, and similarly current may flow from this positive terminal through inductance 107, back contact 12 of the push button repeating relay A2LR and front contact 12 of the token repeating relay A2TP to link wire A2L. When a route is set up toward the right from this fix-posting having a token therein the push button repeater relay A2LR will be picked up and by the opening of its back contact 12 will deenergize the link wire A2L, whereas if a route toward the left is set up the push button repeater relay A2LL will be picked up and by the opening of its back contact 13 will deenergize the link wire A2R. The manner in which these push button repeating relays A2LL and A2LR and their associated direction relays A2DR and A2DL are controlled will be more specifically pointed out in the complete operation of the system hereinafter described.

*Brief operation*

By reason of the complex network of circuits involved, it is considered desirable to first give a brief description of the operation of the system by discussing the manipulation of the various push buttons and dials and the results accomplished thereby and without discussing the specific circuits involved, and then follow this with a complete description of the operation in which each of the circuits involved in the operation is specifically traced and in which the functioning of the apparatus involved is specifically pointed out.

Referring to Figs. 1 and 2 of the drawings, let us assume that information is received by the operator that a flight route is to be set up at the 2000 foot altitude and through fixes A, B and C in that order, namely, a route from left to right. This information would probably come to the operator by telephone or printing telegraph in short form called a flight plan which might read: flight plan 122, speed 180, estimated over A at 10:00, cruising 2000 to enter A at 2000. If we disregard the estimated arrival time posting units and calculator, which are contemplated being used but which for convenience have been omitted, the operator will proceed to post the proposed route by inserting the token 122T in token jack A2T, as shown in Fig. 1 of the drawings. Since there is a 2000 foot altitude posting area available at posting 2 in fix A and at posting 1 in each of fixes B and C, the operator may proceed to push the push button A2RX and B1LX followed by depressing of the push buttons B1RX and C1LX. This manipulation of these push buttons follows the insertion of the token 122T in token jack A2T and will cause the rotary stick relay unit AB2R including magnet AB2M to be picked up in the number 1 position and will cause the rotary stick relay unit BC1R to also be picked up in the number 1 position and will also cause the picking up of the direction relays B1DR and C1DR and will cause the picking up of the push button repeating relays A2LR, B1LL, B1LR and C1LL. With these relays and rotary stick relay magnets AB2M and BC1M energized with their respective rotary contacts in the number 1 position, a route circuit, which will be traced hereinafter, is established. It is readily seen that the picking up of these push button repeater and direction relays will cause the illumination of direction light A2EQR, B1WQR, B1EQR and C1WQR on the control board and will result in the lighting of similarly designated lamps, except that the letter "K" has been substituted for the letter "Q" on the flight progress board.

The operator may then, to cause posting to take place, depress his token 122T and depress the west-to-east transfer push button WETB (see Fig. 5M) in response to which the airplane identifying number 122 will be displayed by the identity posting units at posting 2, fix A, and at posting 1 of fixes B and C on the flight progress board FBP shown in Fig. 2 of the drawings.

Let us now assume that the operator for some reason or another desires to transpose the information displayed at posting 1, fix B, into the posting area 2 of fix B, it being assumed that the posting area 2 of fix B is then inactive and not in use. Since, as shown in Fig. 2, the posting 2 of fix B displays an altitude 3, meaning 3000 feet, it will be first necessary for the operator to turn the altitude dial at posting 2, fix B to display the number 2, in response to which the altitude posting unit for posting 2 of fix B on the flight progress board (Fig. 2) will be electrically operated to display the numeral 2.

Let us now assume that transposition of airplane identity and of estimated arrival time from the posting area 1 of fix B into the posting area 2 of fix B is to be accomplished. By using the apparatus provided, this becomes a very simple manipulation of push buttons by the operator, in that all that the operator is called upon to do is to momentarily depress the "from" button B1FM and the "to" button B2TO on panel B of the control board shown in Fig. 1 of the drawings. Depression of these buttons B1FM and B2TO will result in the picking up of the transposing relay BTR (see Fig. 5I). This will then be followed by the picking up of the auxiliary push button relays B2LXP and C1LXP which will be followed by the picking up of the repeater relays BLLP and BLRP (see Figs. 5I and 8B).

The picking up of the relay BTR supplemented by the closing of push contact 14 of the push button B1FM will result in the application of energy to the transformer associated with the alternating current relay B1ER. Since, as it is obvious from the route circuit network, the picking up of this alternating current relay B1ER will also result in the picking up of the alternating current relays A2ER and C1ER, it is readily seen that all of the alternating current relays for the original route circuit now assume their energized condition. With these alternating current relays in their energized condition, a bridge circuit for the original flight route circuit is closed and this bridge circuit may be traced from the link wire A2R (Fig. 5B) through front contact 17 of the alternating current relay A2ER, down wire $56^2$ through Figs. 5H and 5I, and into Fig. 5J up this same wire $56^2$ through front contact 18 of the alternating current relay B1ER to link wire B1L, back contact 12 of relay B1TP, back contact 12 of relay B1DL, front contact 12 of relay B1DR, back contact 13 of relay B1TP, link wire B1R, front contact 17 of relay B1ER down wire $56^1$ and to the right over this same wire through Figs. 5J and 5K, front contact 18 of relay C1ER (Fig. 5L) to the link wire C1L. The completion of this bridge circuit will for obvious reasons maintain the relays A2LR, B1LL, B1DR, B1LR, C1LL and C1DR energized through their respective stick circuits, and will also maintain the remaining portion of the flight route circuit in advance energized. With the apparatus in the transient condition just described (relays BTR, B2LXP and C1LXP energized and the bridge circuit established) the stick circuits for the holding magnets AB2M and BC1M will be broken to cause these magnets to return to their deenergized position in which their respective selecting contacts 97 are again rotated with the shaft 90. The stick circuit for magnet AB2M is momentarily broken at back contact 18 of relay BTR (later shunted by back contact 11 of relay BTRP) the contact 11 of relay A2ER being up (see Fig. 8A). The stick circuit for magnet BC1M is broken at push contact 15 of push button B1FM, the contact 11 of alternating current relay B1ER also being up at this time.

The necessary circuits are now closed to establish a new route circuit which extends from posting 2, fix A, through posting 2, fix B and to posting 1, fix C. Simultaneously, with this establishment of a new flight route circuit the indication of airplane identification which was formerly displayed in posting 1 of fix B is transposed into posting 2, fix B and after all of these functions have been performed the relays BTR, B2LXP, C1LXP and all the energized alternating current relays will be returned to their normal deenergized condition. With these relays returned to their deenergized condition the "bridge" circuit heretofore mentioned is removed, the old portion of the route circuit will be isolated and deenergized, and the relays B1LL, B1DR, B1LR, BLLP and BLRP are returned to their deenergized condition so that all of the apparatus is in the same condition as if the operator had originally set the altitude dial for posting 2, fix B, to the number 2 position and had set up the proposed route through postings 2 of fixes A and B and through posting 1 of fix C. It may be pointed out here that it was not necessary for the operator to hold the transposing buttons B1FM and B2TO depressed during this entire period of transposition, it being only necessary to hold these buttons depressed until the transposing relay BTR, the push button repeating relays BLLP and BLRP, and the alternating current relay B1ER had assumed their energized and stuck-up position.

Let us now assume that the airplane 122 reports flying over fix A and later reports flying over fixes B and C in that order. Each time that an airplane reports flying over a fix the time at which such flight takes place will be displayed in the column "over" on the flight progress board (see Fig. 2) and the operator will bring up his token from the rear to the fix at which the actual arrival time of the airplane was last reported. The operator may then by depressing his token cause the cancellation of that portion of the flight route to the rear of that fix.

*Detailed operation*

*Establishing a flight route circuit.*—Let us now consider specifically the establishment of a flight route circuit for the flight route passing through posting 2 of fix A and through postings 1 of fixes B and C above discussed. The operator will of course first select his token 122T and insert it in the token jack A2T (see Figs. 1, 5A and 5B). This insertion of the token 122T in token jack A2T will cause closure of the contacts H1, T2 and U2 (see extreme left side of Fig. 5A) and will result in closure of the contact 11 of this token jack A2T (see upper part of Fig. 5B of the drawings). The closure of this latter contact 11 results in the picking up of the token repeating relay A2TP. With this token repeating repeating relay A2TP picked up, current may flow from the (+) terminal of the network battery through inductance 107, back contact 13 of the push button repeating relay A2LL, and front contact 13 of the token repeating relay A2TP to the link wire A2R. Current may also flow through the other inductance 107, back contact 12 of relay A2LR, and front contact 12 of relay A2TP to link wire A2L.

The operator will now depress the push buttons A2RX and B1LX (see Figs. 1, 5B and 5J). Depression of these push buttons A2RX and B1LX will cause closure of the following circuit for the magnet AB2M of rotary stick relay unit AB2R at the instant the shaft 90 assumes the number "one" or 1 position. This circuit may be traced from the terminal (+) of the network battery through back contact 12 of the push button repeating relay B1LL (see Fig. 5J), push contact 12 of the push button B1LX, wire 81, seeker rotary contact 80 (see lower left-hand corner of Fig. 5I), wire 79 (see Figs. 5H and 5B), upper winding of the magnet AB2M of the rotary stick relay unit AB2R (see Figs. 3 and 5B), back contact 13 of the push button repeating relay A2LR, through push contact 12 of the push button A2RX, to the other terminal (−) of the network source. The closure of this circuit at the instant the shaft 90 assumes the number "one" position the circuit for the magnet AB2M is closed and causes downward movement of its armature 100 (see Fig. 3) to cause disengagement of the pin 97$^b$ from the disc 96 on shaft 90 and causes the engagement of the pin 97$^a$ in the number "one" hole of the fixed plate 99, namely, where the rotary contact 97 (see also Fig. 5B) engages the number "one" stationary contact, as a result of which the link wire A2R (see Fig. 5B), is connected to the link wire B1L (Fig. 5I). As soon as the magnet AB2M has been fully picked up (armature moved down), the shaft 90 of course continuing in its operation, the pick-up circuit for this magnet is broken at the seeker rotary contact 80 so that a stick circuit for this magnet AB2M must be relied upon. This stick circuit for the magnet AB2M may now be traced from the link wire A2R, to which the (+) terminal of the network battery is already connected as heretofore pointed out, through pull contact 13 of the push button A2RX, stick contact 12 of the magnet AB2M, the lower winding of this magnet and back contact 11 of the alternating current relay A2ER to the other terminal (−) of this network battery. The magnet AB2M is sufficiently slow releasing so that it will not release during movement of this contact 11 of relay A2ER from its back to its front contact or vice versa as it will be called upon to do as more fully pointed out hereinafter.

The newly established portion of the route circuit may now be traced from the link wire A2R through contact 97 of the rotary stick relay unit AB2R, assuming the number "one" position, down the vertical bus wire 1, to the link wire B1L. With the magnet AB2M picked up and stuck up an energizing circuit for the push button repeating relay A2LR is closed which may be traced from the link wire A2R, connected to the plus terminal (+) of the network battery, through pull contact 13 of the push button A2RX, through stick contact 12 of the magnet AB2M through the winding of the relay A2LR to the terminal minus (−). This push button repeating relay A2LR is however slow in picking up, as conventionally illustrated, and will not pick up its contacts until the push button repeating relay B1LL has been picked up through a circuit including the back contact 11 of this slow pick-up push button relay A2LR. This pick-up circuit for the push button repeating relay B1LL may now be traced from the terminal (+) of a suitable source of current through back contact 11 of the push button repeater relay A2LR, front contact 11 of clutch magnet AB2M, vertical wire 77, wire 94, push contact 11 of the push button B1LX, the upper winding of the relay B1LL, and pull contact 13 of this push button B1LX to the other terminal (−) of this same source. As soon as this relay B1LL is picked up it is stuck up through a stick circuit which includes its stick contact 11 and derives its energy from the link wire B1L now connected to link wire A2R. A moment after the push button repeating relay B1LL picks up the pick-up time for the slow pick-up push button repeating relay B2LR has expired and this latter relay will also pick up.

Referring to Fig. 5J it will be readily seen that when energy is applied to the link wire B1L in a manner as just pointed out, this current may flow through back contact 12 of the token relay B1TP, back contact 12 of the direction relay B1DL and to the upper winding of the direction relay B1DR, so that this latter direction relay B1DR will be picked up. It will be immediately stuck up through a circuit including its stick contact 11, which circuit derives its holding energy from the link wire B1L. The route circuit under consideration has now been fully set up to posting 1 of fix B, and the arrow lights A2EQR, A2EKR, B1WQR, and B1WKR are illuminated.

The operator will now depress the push buttons B1RX and C1LX (see Figs. 1, 5J and 5L). Depression of these push buttons B1RX and C1LX will result in the picking up of the relays B1LR, C1LL, C1DR and the magnet BC1M of the rotary stick relay BC1R in exactly the same manner as relays A2LR, B1LL and B1DR and clutch magnet AB2M of the rotary stick relay unit AB2R were picked up, as just described. The extended portion of the route circuit as just established may now be traced from the link wire B1L, through back contact 12 of the token repeating relay B1TP, through back contact 12 of the direction relay B1DL, front contact 12 of the direction relay B1DR, and back contact 13 of token repeating relay B1TP, to link wire B1R, through contact 97 of the rotary stick relay unit BC1R assuming the number "one" position, altitude wire 1, to the link wire C1L. For reasons already pointed out the arrow lamps B1EQR, B1EKR, C1WQR, and C1WKR are now also energized and illuminated.

*Posting of airplane identity.*—The operator will now proceed to post the airplane identity number 122 in the columns headed "identity" at posting 2 of fix A and at postings 1 of fixes B and C, this on the assumption that the arrival times have been calculated by the west-to-east calculator (not shown) and it is satisfactory to post the route. This is accomplished by depressing the token 122T, now located in token jack A2T, and simultaneously therewith depress the transfer button WETB (Fig. 5M). Depression of the token 122T and token jack A2T in which it is contained will cause closure of the push contact 13 of this token jack A2T (see lower right-hand corner of Fig. 5B). The closure of this token jack push contact 13 allows current to flow from the upper terminal of the secondary winding of the transformer TRA (Fig. 5M) through wire 53 (Figs. 5M, 5L and 5K), back contact 15 of the transposing relay CTR, wire 53¹ (Figs. 5K, 5J and 5I), back contact 15 of the transposing relay BTR, wire 53² (Figs. 5I, 5H and 5G), back contact 15 of the transposing relay ATR, wire 50 (Figs. 5G and 5H), wire 73, push contact 13 of the token jack A2T (Fig. 5B), to the right-hand terminal of the transformer associated with the alternating current relay A2ER, the relay A2ER receiving energy through the medium of a full-wave rectifier shown.

This alternating current may also flow through this push contact 13 of token jack A2T, through the condenser CA2R, front contact 14 of the push button repeating relay A2LR, link wire A2R, contact 97 of the rotary stick relay AB2R assuming the number "one" position, down the vertical bus wire 1, to link wire B1L, front contact 14 of the push button repeating relay B1LL, condenser CB1L, to the right-hand terminal of the transformer associated with the alternating current relay B1ER, so that this latter relay is also energized and picked up. Similarly, this alternating current may continue its flow from the link wire B1L through back contact 12 of the token repeating relay B1TP, back contact 12 of the direction relay B1DL, front contact 12 of the direction relay B1DR, back contact 13 of the token repeating relay B1TP, link wire B1R, contact 97 of rotary stick relay unit BC1R assuming its number "one" position and wire 1 to link wire C1L which through front contact 14 of the push button repeating relay C1LL and condenser CC1L is connected to the right-hand terminal of the transformer associated with the alternating current relay C1ER. This latter portion of the alternating current circuit causes this latter relay C1ER to be also energized and picked up.

Depression of the west-to-east transfer button WETB as above pointed out, results in the picking up of the west-to-east calculator relay WETBR which applies energy to the calculator contacts of the west-to-east calculator for posting arrival time in the proper posting units, but this feature of the system has for convenience been omitted from the drawings. This relay WETBR upon picking up is stuck up through a stick circuit including its stick contact 11 and the front contact 13 of the master posting relay MPR, this master posting relay MPR having been picked up through push contact 12 of the push button WETB. With the master posting relay MPR now energized current may flow from the (+) terminal of a suitable source of current through front contact 13 of this relay MPR, wire 63 (Figs. 5M, 5L, 5K, 5J, 5I, 5H and 5B), front contact 14 of the alternating current relay AE2R, front contact 17 of the token repeating relay A2TP, wire 74, through contacts H1, T2 and U2 of the token jack A2T, wire 1 of cable 30 and wires 2 of each of the indicating cables 31 and 32 which terminate at the master panel shown in Fig. 5M of the drawings where this current may flow through the conversion relays HR1, TR2 and UR2, and to the other terminal (−) of this source of current. This of course results in the picking up of these conversion relays HR1, TR2 and UR2 which in turn causes the application of current from the (+) terminal of a suitable source of current to all of the wires in cable 40 except wire 1, and all of the wires of cables 41 and 42 except the wires 2 of these cables through the medium of front contacts of these conversion relays HR1, TR2 and UR2.

These control cables 40, 41 and 42 extend over Figs. 5L, 5K, 5J, 5I, 5H and 5G to the lead-in wires of the identification posting units IA2H, IA2T and IA2U respectively, and from whence current may flow through the clutch magnets 87 of each of these posting units from whence the circuit continues through wire 75, front contact 15 of the alternating current relay A2ER, down the vertical bus 76, through back contact 20 of the transposing relay ATR, to wire 60 which continues through Figs. 5H, 5I, 5J, 5K, 5L and 5M through the winding of the series relay MCPR and front contact 12 of the master posting relay MPR to the other terminal (−) of this source.

The completion of this circuit will of course cause these three posting units, among others, as well as the posting units located at posting 1, fixes B and C, to be operated and cause the picking up of the series relay MCPR (Fig. 5M) and hold it energized until all of these posting units have been operated to the proper position, at which position the various rotary contact arms 86 of these posting units reach a dead lead-in wire. Current may also flow from the plus (+) terminal of said source through back contact 12 of relay A2EPS through the upper winding of the lighting relay A2EP and through front contact 15 of relay A2ER to wire 76, from whence, as just pointed out, the current may flow over back contact 20 of relay ATR and wire 60, through the winding of series relay MCPR and front contact 12 of master posting relay MPR to the other terminal (—) of this source. This latter circuit is employed so that the lighting relay A2EP will pick up at least momentarily if all posting units have already assumed the proper position and the first mentioned of the two circuits was not closed because all of the involved contacts 86 engaged deenergized lead-in wires.

When all of these nine posting units have been operated to the proper position the series relay MCPR will again be deenergized. While this relay MCPR was energized, however, an energizing circuit for the lower winding of the lighting relay A2EP was closed. This circuit may be traced from the terminal (+) of a suitable source of current, front contact 12 of the master series relay MCPR, wire 61 (Figs. 5M, 5L, 5K, 5J, 5I and 5H) through back contact 21 of the master transposing relay ATR (Fig. 5H), vertical wire 88, front contact 16 of alternating current relay A2ER, through the lower winding of the lighting relay A2EP and to the other terminal minus (—) of said source. The picking up of this lighting relay A2EP will by the closure of its front contact 12 cause the repeater stick relay A2EPS to be picked up through a circuit including the front contact 15 of the push button repeating relay A2LR and as soon as this relay A2EPS is picked up it will be stuck up through a stick circuit including its stick contact 13 and this same front contact 15 of the relay A2LR. With both of these relays A2EP and A2EPS now picked up the lighting circuit for the lamps A2EL is closed at front contact 11 of the relay A2EPS but is held open at the back contact 11 of the relay A2EP. From this consideration, it is readily seen that when this relay A2EP drops in response to the dropping of the master series relay MCPR (Fig. 5M) the lighting circuits for the lamps A2EL are closed through front contact 11 of the relay A2EPS and back contact 11 of relay A2EP (Fig. 5B). This master series relay MCPR will however not drop to its deenergized position until all of the nine posting units have been brought to stop where each of the three groups of posting units display the number 122.

The posting units for posting the airplane identification number 122 at posting 1 of fixes B and C, namely, the posting units IB1H, IB1T, IB1U, IC1H, IC1T, and IC1U will in like manner be operated to their respective positions to indicate the flight number 122, after which they will have their respective lighting lamps A2EL, B1EL and C1EL lighted in a manner as just described in connection with the posting units for posting 2 of fix A. As soon as all of these posting units for posting 2, fix A, and posting 1 of fixes B and C have reached their ultimate indicating position, where they indicate the airplane identification number 122 the master series relay MCPR (Fig. 5M) will of course be deenergized, and as it drops to its deenergized position it opens its front contact 14 before the back contact 11 of its repeater relay MCPRP is closed, as a result of which the stick circuit for the master posting relay MPR is momentarily broken and this relay MPR is dropped to its deenergized position. It is of course readily understood that the relay MCPRP is controlled through the front contact 13 of the series relay MCPR. Dropping of the master posting relay MPR will of course by the opening of its front contact 13 break the stick circuit for the west-to-east calculator relay WETBR so that this calculator relay again assumes its deenergized position. The circuit controlled through front contact 12 of this calculator relay WETBR is not shown in detail because the calculator posting apparatus has for convenience been omitted from the drawings. It should be noted that the two arrival time posting relays WETBR and EWTBR are interlocked through the medium of their respective back contacts 13. This is of course desirable to prevent possible double posting of calculated arrival times.

Referring to Figs. 5A–5L and to the abbreviated drawing of Figs. 8A, 8B and 8C, let us assume that a flight route passing through posting 2 of fix A and through postings 1 of fixes B and C has been established as has just been assumed and that the airplane identifying number 122 is displayed in the identification posting units at the proper posting on each of these fixes A, B and C. Let us now assume that the operator finds it necessary to transpose the flight route under consideration at fix B from posting 1 to posting 2. That is, it is desired to have the flight route circuit extend through postings 2 at fixes A and B and through posting 1 of fix C with the proper direction arrow lamps lighted and with the airplane number 122 displayed at each of these posting fixes. This also implies that the arrival time will also be transposed but the apparatus for this function has not been shown but is identical to that for transposing the airplane identification number. To accomplish this (referring particularly to Fig. 8) the operator will depress the "from" push button B1FM and the "to" push button B2TO. The first function which must be performed during this transposition of postings is to provide a temporary shunt route circuit bridging from link wire A2T to link wire C1L. This is necessary to prevent premature dropping of the various stick push button repeating and directional stick relays of the set-up route.

Depression of the "from" button B1FM and the "to" button B2TO completes a pick-up circuit for the relay BTR, which may be traced from the (+) terminal of a source of current, front contact 16 of the relay B1EPS (indicating that the posting units for posting 1 of fix B are lighted), push contact 11 of button B1FM, push contact 14 of push button B2TO, back contact 15 of relay B2EPS (manifesting that the posting units of posting 2, fix B are dark) through the winding of the relay BTR to the other terminal (—). Picking up of this relay BTR causes alternating current to be applied to the transformer associated with alternating current relay B1ER through front contact 13 of the relay BTR and push contact 14 of the push button B1FM. As soon as this relay B1ER picks up the closure of its front contact 22 shunts the push contact 14 of the push button B1FM so that the alternating current remains applied to the original route circuit even though the "from" push button is returned to its inactive position.

It is of course understood from Figs. 5A-5L that if alternating current is applied to any one of the alternating current relays associated with a particular set-up route that all of the other alternating current relays associated with such route will also be energized.

Referring now to Figs. 5A-5L of the drawings, the bridge circuit above mentioned for connecting the link wire A2R with link wire C1L may be traced from link wire A2R through front contact 17 of the alternating current relay A2ER, down wire 56² at fix A and extending from fix A to fix B, up wire 56² at fix B, through front contact 18 of the relay B1ER, back contacts 12 and 12 of relays B1TP and B1DL, front contact 12 of relay B1DR, and back contact 13 of relay B1TP, link wire B1R, front contact 17 of relay B1ER, down wire 56¹ at fix B extending to fix C and then up on wire 56¹ at fix C and through front contact 18 of the alternating current relay C1ER to link wire C1L. This bridge or shunt connection assures that none of the stick relays beyond the fix A on the route under consideration will become deenergized during the transposing operation.

It is readily seen that the picking up of relay BTR (Figs. 5I and 8B) by closing its front contact 12 closes a pick-up circuit for the auxiliary push button repeating relay B2LXP including the push contact 12 of the "to" button B2TO and that this relay B2LXP is then stuck up through a stick circuit including its stick contact 13 and including this same front contact 12 of the relay BTR. Similarly, the auxiliary push button repeating relay C1LXP is energized through a circuit including front contacts 12, 18 and 23 of the relays BTR, B2LXP and C1ER respectively. Since these latter three relays are held energized until the transposing has been completed no stick circuit for this relay C1LXP need be closed at this time.

Referring to Figs. 5A-5L it will be observed that push button repeating repeating relays BLLP and BLRP have been provided for fix B for repeating similarly designated push button repeating relays and that similar relays have been provided for fixes A and C (see also Fig. 8). Depression of the push button B1FM will through the medium of its push contact 12 and the front contact 19 of the push button repeating relay B1LL close a pick-up circuit for the relay BLLP. This relay BLLP is then stuck up through its stick contact 11, back contact 17 of the relay B2LL, front contact 14 of the relay B2LXP, and front contact 12 of the relay BTR. Similarly, the push button repeating repeating relay B1RP is picked up through the push contact 13 of the push button B1FM, and front contact 19 of relay B1LR. This second push button repeating repeating relay BLRP is stuck up through a stick circuit including front contact 11 of this relay and including the back contact 17 of the relay B2LR, front contact 14 of relay B2LXP, and the front contact 12 of the relay BTR. The relay BTR is provided with a stick circuit including its stick contact 11 and including in multiple the front contacts 12 of the push button repeating repeating relays BLLP and BLRP.

Since the rotary contact 97 associated with the rotary stick relay unit AB2R that is used in the old route at section A—B also constitutes an element of the new route and since the rotary contact 97 associated with the stick relay unit BC2R will be substituted for the rotary contact 97 associated with stick relay unit BC1R, it is necessary to restore these rotary stick relay units AB2R and BC1R to their deenergized condition before the new route circuit, to be established by the transposing operation, can be established. Let us now observe how the old route is cancelled, that is, how the rotary stick relay units AB2R and BC1R are restored to their normally deenergized and resynchronized condition. This restoration is, of course, accomplished by deenergization of the stick circuits for the associated holding magnets AB2M and BC1M.

Referring to Fig. 8A, with the alternating current relay A2ER in its energized condition the negative portion of the stick circuit for the holding magnet AB2M passes through front contact 11 of this alternating current relay A2ER, through the normally closed push contact 15 of the "from" button A2FM, bus wire 51⁵, the back contact 16 of the relay ATR, wire 51⁴, and through back contacts 18 and 11 of relays BTR and BTRP respectively in multiple, to the terminal (—). Since, however, the repeater relay BTRP is slow in dropping it is readily seen that the stick circuit for this magnet AB2M is temporarily broken upon picking up of the relay BTR, the back contact 11 of relay BTRP closing after a short period of delay. The holding magnet AB2M therefore drops to its deenergized position.

Let us now observe how the stick circuit for the magnet BC1M (lower winding) is broken. It is, of course, understood that the alternating current relay B1ER assumes its energized condition to hold its front contact 11 closed, and that this magnet BC1M will be deprived of energy for its lower winding at push contact 15 of push button B1FM and also at open back contact 16 of relay BTR when the relay B1ER is in its picked up condition, as will shortly be the case. The upper windings of these holding magnets AB2M and BC1M are, of course, deprived of energy because the back contact 13 of the associated push button repeating relays A2LR and B1LR are open since these push button repeating relays now assume their energized position. The holding magnets AB2M and BC1M therefore drop to their deenergized position, thereby causing the rotary contact which was included in the original route circuit to be opened and to be resynchronized with its rotating shaft 98. That is, the old route circuit is destroyed.

While this cancelling of the old or original route took place the indications displayed by the identification posting units at posting 1 of fix B were copied to the identification conversion relays from whence copying to the posting units for posting 2 of fix B took place. Copying from the posting units of posting 1 to the conversion relays was accomplished through a circuit including the front contact 12 of the relay BTR, wire 71, back contact 18 of the auxiliary relay B1LXP, the front contact 20 of the alternating current relay B1ER through (now see Fig. 5J) front contact 14 of the relay B1EPS, wire 111, rectifiers 112, the rotary contacts 110 of the posting units IB1H, IB1T, IB1U, through cables 40, 41 and 42 to the windings of the identification conversion relays HR1, TR2 and UR2 (Fig. 5M). Similarly copying took place from the contacts of these identification conversion relays into the posting units IB2H, IB2T, IB2U of posting 2, fix B, through a circuit starting at the plus (+)

terminal of a source of current, front contacts of the then energized conversion relays HR1, TR2 and UR2 (Fig. 5M) over all of the wires in cables 40, 41 and 42 except wire 1 of cable 40 and wires 2 of cables 41 and 42, through the contacts 86 and clutch magnets 87 of posting units IB2H, IB2T, IB2U, through wire 75, front contact 21 of relay B2LXP (see also Fig. 8) vertical bus wire 113, front contact 20 of relay BTR, wire 60, winding of the series relay MCPR (see Fig. 5M), through wire 62 (Figs. 5M, 5L, 5K and 5J), through front contact 14 of the relay BTR (Fig. 5I) to the other terminal minus (—) of the same source.

When the posting units IB2H, IB2T and IB2U have reached the position where they in combination indicate the number 122 all of the circuits above traced through their respective clutch magnets 87 and the master series relay MCPR are opened and this relay MCPR assumes its de-energized position. As it drops it opens its contact 12 included in the circuit including wire 61 (Figs. 5M, 5L, 5K and 5J), front contact 21 of relay BTR, wire 114, front contact 22 of relay B2LXP and the lower winding of the relay B2EP, the relay B2EPS having been picked up in the meantime. The opening of the circuit just traced will cause dropping of the relay B2EP and lighting of the posting units IB2H, IB2T and IB2U.

Let us now observe how the new portion of the route circuit extending from posting 2 of fix A through posting 2 of fix B and ending at posting 1 of fix C is established. It is of course readily seen that the rotary contact 97 associated with the holding magnet AB2M of the rotary stick relay AB2R must now be actuated to the number 2 position and held there, it formerly having occupied the number 1 position, and that the rotary contact 97 associated with the holding magnet BC2M for rotary stick relay BC2R must be energized to the number 1 position the holding magnet BC1M having been energized in establishing the original route circuit. The pick-up circuit for the magnet AB2M may now be traced from the (+) terminal of the network battery through front contact 12 of the auxiliary push button relay B2LXP (Fig. 5D), wire 82, down altitude bus wire 82, to contact 2 of the seeker rotary switch 80 of the rotary stick relay ABRSR, through wire 79, upper winding of the holding magnet AB2M (see also Fig. 8), back contact 13 of the relay A2LR, front contact 19 of the alternating current relay A2ER, to vertical bus wire 52⁵, back contact 17 of the relay ATR, wire 57², front contact 20 of the relay B1LXP, vertical bus wire 116, through front contact 15 of the direction relay B1DR, front contact 21 of the alternating current relay B1ER, to the other terminal (—). This will cause picking up of the rotary contact of the holding magnet AB2M at the 2 position after which the magnet AB2M remains energized through its stick circuit including its stick contact 12, the pull contact 13 of the push button A2RX, to link wire A2R connected to the plus (+) terminal of a source. The (—) terminal of this source is connected to the other side of the lower coil of holding magnet AB2M through front contact 11 of relay A2ER, push contact 15 of push button A2FM, down bus wire 51⁵, back contact 16 of relay ATR, wire 51⁴, and back contact 11 of relay BTRP from such other terminal minus (—) of the same source.

The picking up of holding magnet AB2M, the relay B2LXP being energized, closes a pick-up circuit for push button repeating relay B2LL. This pick-up circuit may be traced from the terminal plus (+), back contact 11 or relay A2LR, front contact 11 of holding magnet AB2M, vertical bus wire 77, wire 94, front contact 11 of relay B2LXP, upper winding of relay B2LL and pull contact 13 of push button B2LX to the other terminal minus (—). The stick contact 12 of magnet AB2M also applies current to the push button repeating relay A2LR which will now again pick up. It is, however, slow in picking up to an extent that the relay B2LL was fully picked up and stuck up before its back contact 11 opened.

The circuit for picking up holding magnet AB2M is completed before a similar circuit for the holding magnet BC2M is completed. This is necessary by reason of the fact that original traffic was from left to right and in order to maintain this direction of flight route set-up it will be necessary for the new partial route circuit to be established in sequence in a left to right order. The circuit for picking up the magnet BC2M in the number "one" position may now be traced by starting at the (+) terminal of a suitable source of current, front contact 12 of the relay C1LXP (Fig. 5L), wire 81, vertical bus wire 81, stationary contact 1 of the seeker rotary stick relay BCRSR for section B—C, rotary contact 80 thereof, vertical bus wire 79 (see Figs. 5J and 5D), upper winding of the magnet BC2M of Fig. 5D (refer now also to Fig. 8), back contact 13 of the relay B2LR, front contact 16 of relay B2LXP, vertical bus wire 109, front contact 15 of this same relay, wire 117, front contact 18 of relay B2LL (the contact which determined the sequence), vertical wire 116, and then through front contact 15 of the direction relay B2DR, and front contact 21 of the alternating current relay B2ER to the vertical bus wire 109 connected to the other terminal (—) of said source. It may be pointed out here that front contact 18 of relay B2LL was closed in response to the closure of front contact 11 of the relay AB2M. In other words, the pick-up circuit for this latter magnet BC2M was only closed after the pick-up circuit for the first magnet AB2M had been closed so that the newly established route portion is established in the left to right order and causes the picking up of the direction relay B2DR as distinguished from the direction relay B2DL.

It will be remembered that the relay BTR was maintained energized by a stick circuit including its stick contact 11 and the front contacts 12 in multiple of the relays BLLP and BLRP. It should be noted that these multiple contacts 12 also have in multiple therewith a front contact 11 of the relay MCPR of the master control apparatus shown in Fig. 5M (see also Fig. 8). It should also be noted that the right-hand terminal of the winding of relay MCPR is connected through bus wire 62 and through front contact 14 of the relay BTR to (—), this circuit establishing the negative connection to the various posting units to be operated during transposition. As long as these posting units remain operating through transposing circuits hereinbefore described, the master relay MCPR assumes its energized position and keeps its front contact 11 closed, thereby holding the relay BTR energized through this stick circuit in spite of prior opening of its other two stick circuits including the front contacts 12 of the relays BLLP and BLRP in multiple. As soon as the new route circuit portion was established the push button repeating relay B2LL and B2LR were picked up in the same manner as when these routes are established by manual operation of the entrance and exit push buttons. With these two relays B2LL and B2LR now energized and their respective back contacts 17 open, these open back contacts 17 interrupting the stick circuits for relays BLLP and BLRP, these relays drop and open their front contacts 12. The relay BTR must now rely on holding energy flowing through the front contact 11 of the master series relay MCPR. As soon as all of the posting units have completed their operation and have been brought to a stop this master series relay MCPR is deenergized thereby opening its front contact 11 resulting in the deenergization of this stick circuit for the relay BTR. This relay BTR will now drop to its deenergized position and in so doing will deenergize the auxiliary push button relays B2LXP and C1LXP. Since the alternating current for energizing the various alternating current relays on both the original route circuit and the modified route circuit flowed through front contact 13 of the relay BTR the dropping of this relay will remove alternating current from the old as well as the new route network, thereby causing all of the alternating current relays for these particular routes to assume their deenergized position. This results in the opening of the bridge circuit heretofore traced and in the dropping of the push button repeating relays B1LL and B1LR and direction relay B1DR. The dropping of the push button repeating relays B1LL and B1LR by the opening of their respective contacts 15 opens the stick circuit for the lighting stick relay B1EPS which in turn opens its front contact 11 to open the energizing circuits for the lamps B1EL which formerly illuminated the identity posting units IB1H, IB1T and IB1U. Furthermore, the dropping of these push button repeating relays B1LL and B1LR by opening of their respective front contacts 16 extinguish the direction arrow lights B1WQL, B1WKL, B1EQR and B1EKR, the corresponding arrow lights for posting 2 of fix B having been energized and lighted in the meantime, so that the new route with its display of the flight number 122 is fully established and the old route at posting 1 of fix B has been wholly extinguished and all of the transposing apparatus has now been returned to its original condition.

Let us now assume that the airplane 122 proceeds over the 2000 foot altitude route which had been assigned to it and that it reports arriving at fix B at a certain time. This arrival time over fix B will then be displayed in the column "over" at posting 2, fix B, in a manner as described in the above mentioned prior applications, Ser. No. 489,774 and Ser. No. 500,672. The operator may now remove his token 122T from token jack A2T and advance it and insert it in token jack B2T. This advancement and insertion of the token in the next token jack B2T produces no result insofar as the flight progress board is concerned. This insertion of the token 122T in the token jack B2T however does result in the picking up of the token repeating relay B2TP for reasons hereinbefore described. The picking up of this token repeating relay B2TP isolates the link wire B2L from the link wire B2R by the closing of its front contacts 12 and 13. The link wire B2R is, however, now supplied with current which flows from the terminal (+) through the inductance 107, back contact 13 of the relay B2LL, and front contact 13 of the relay B2TP, to the link wire B2R. Depression of the token now in token jack B2T causes opening of the stick circuit of relay A2TP at push contact 12 of token jack B2T and dropping of this relay A2TP. In this connection it should be observed that the directional relay B2DR is slower dropping than is the push button repeating relay B2LL as a result of which the back contact 13 of the relay B2LL closes before the front contact 13 of the relay B2DR opens so that the continuity of current flow to the link wire B2R is not disturbed. The left-hand link wire B2L is, however, now deprived of energy, the token repeating relay A2TP having been deenergized and dropped and current also cannot reach this link wire B2L through the front contact 12 of the token repeating relay B2TP because both the front contact 13 and the back contact 12 of the relays B2DL and B2LR, respectively, are open. This depriving of the link wires A2R and B2L of energy results in the dropping of the push button repeating relays A2LR and B2LL and in the dropping of the direction relay B2DR.

In a similar manner advancement of the airplane to fix C and its report of its arrival time at that fix C may result in advancement of the token 122T from token jack B2T to token jack C1T in response to depression of which token the flight route will be cancelled to the rear of fix C in the same manner as has just been described for the route to the rear of fix B.

*Mechanical altitude indication transposing apparatus.*—In Fig. 7 has been illustrated an altitude dial 84 located on the control board together with the apparatus and circuits for operating an altitude indicating posting unit on the flight progress board to a postion to indicate the same alitude. In Figs. 9–13, inclusive has been illustrated apparatus for operating the altitude dial 84 of a particular posting where a "to" button is operated to the same position then assumed by the altitude dial at a posting on the same board where the "from" button is operated, together with means for repeating the new indication on the flight progress board by circuits including the movable contact plate 134. In other words, it is proposed to provide apparatus whereby if a route has been set up through a certain posting on a particular panel to which posting has been assigned a particular altitude to not only electrically transpose the route, its identity and its arrival time to a new posting area on that panel but to also transpose mechanically the indication displayed by the altitude indicating dial.

*Structure-mechanical transposing apparatus.*— Referring to Fig. 9 it will be observed that that portion of the panel B of the control board shown in Fig. 1 containing the "from" buton B2FR and the "to" button B2TO has been shown partly broken away to expose at least part of the mechanical apparatus of the modified construction associated with posting 2 of the panel B and that a plan view of this exposed apparatus has been shown in Fig. 10.

As shown in each of Figs. 9 to 13, inclusive, a single shaft 130 is vertically exposed back of this panel B and extends the full length of the panel. This shaft 130 is used to determine the operated position of any one of the altitude dials 84 in accordance with the position assumed by any other one of these dials 84. Referring to Figs. 10, 11 and 12, it wil be seen that the push rods 131 of the "from" and "to" buttons B2FR and B2TO are slidably supported in angle brackets 132 and 133 secured to the front panel B and rear vertical angle bars 134 and 135 as most clearly shown in Fig. 10. These push rods 131 are held in their non-depressed position by compression springs 136 on these push rods 131. To these push rods 131 are slidably secured cam plates 138 (see Fig. 12) as through the medium of rivets 140 having their heads slidably arranged in slots 140a to which the "to" or "from" button, as the case may be, is fixedly secured. As most clearly shown in Fig. 12, these cam plates 138 and their associated push buttons are held in their non-depressed positions by compression springs 141. It may be pointed out here that these springs 141 are considerably weaker than are the springs 136, so that the springs 141 are fully compressed to the extent permitted by the length of the slots 140a before any deformation, due to compression, of the springs 136 takes place. The inwardly disposed ends of these cam plates 138 contain a cam surface 138a for lifting the clutch plate 143 provided with arms 143a pivoted on studs 144 secured in angle brackets 145 suitably fastened to the bottom plate 137 as by welding. This lifting of the clutch plate 143 takes place through the medium of an arm 143b integral with the arm 143a. It may be pointed out that both the "from" button B2FM and the "to" button B2TO (see Fig. 10) is provided with a cam plate for engaging an arm 143b associated with the clutch plate 143 so that this clutch plate 143 may be lifted by depressing either the "from" button or the "to" button of any posting. This clutch plate 143 is held in its normal position above gear 159 by an adjustable stop screw 146 which may be held in locked position by a lock nut 146a.

As more clearly shown in Figs. 11 and 12, this clutch plate 143 when lifted lifts with it a disc 145 containing a lug 145a. This disc 145 is pivoted on the shaft 130 but is provided with a square bushing (see Figs. 10 and 13) which bushing is slidably secured in a square hole in a bushing constituting part of the gear 147. In other words, the shaft 130 can rotate freely within the disc 145 and its square bushing but this disc 145 can only rotate with gear 147 with which it is slidably associated. This gear 147 is in permanent geared relationship with the altitude dial 84 and contact plate 184 (see Figs. 10, 11 and 13). Each of the push rods 131 has slidably secured thereto a gear rack 150 as through the medium of rivet 151 pinned into these push rods 131 and passing through slots 151a contained in these gear racks 150.

Compression springs 152 are provided to yieldingly hold these gear racks 150 in their extreme right-hand position as viewed in Fig. 10. These springs 152 are provided so that only limited forces may be exerted upon these gear racks 150 upon depression of the associated "to" or "from" button to their fully depressed position. Each of these push rods 131 has secured thereto a cam plate 153, which is used to operate the associated push button contacts 11, 12, etc., through the medium of a roller 154. These contacts 11, 12, etc., are also shown in Figs. 5A–5L and in Figs. 8A–8C and are the contacts which perform the electrical transposing functions. The gear racks 150 associated with the "from" button B2FR and the "to" button B2TO respectively engage pinions 156 and 157 (see Fig. 10) which are operatively connected by spring pressed ratchet teeth to gears 158 and 159 respectively (see Fig. 9). These pinions 156 and 157 (see Fig. 9) are sufficiently wide to allow axial movement thereof without disengagement from their respective gear racks 150 and are held against and in ratchet engagement with their respective gears 158 and 159 by springs 160 and 161 respectively. The gear 158 (see Fig. 9) is in driving gear meshed relationship with a pinion 164 which is suitably secured to the shaft 130 as by a pin 162 and has integral therewith an arm 164a; whereas, the gear 159 is in operative gear meshed relation with a pinion 165 which is integral with the gear 147 heretofore mentioned. This latter pinion 165 is provided with a square hole to receive the square bushing constituting part of the disc 145.

Referring to Figs. 9 and 12 it should be observed that the shaft 130 can only be rotated in a counterclockwise direction as viewed from the top. This is due to the one-way ratchet connection between this shaft 130 and a fixed support. This ratchet connection comprises a ratchet toothed hub 171 keyed or pinned to the shaft 130 as conventionally shown by the pin 173 and urged upwardly by a spring 172 into ratcheting engagement with a similar ratchet toothed hub 170a integral with the fixed plate 170. It is thus seen that the shaft 130 can only be moved in a counterclockwise direction. Similar ratchet drives are provided between the pinions 156 and 157 and their respective gears 158 and 159 (see Fig. 9). From this consideration it becomes apparent that if a "from" button is depressed it will cause rotation of pinion 156 and gear 158 in a clockwise direction resulting in rotation of the shaft 130 in a counterclockwise direction, and that the release of this "from" push button will cause ratcheting to take place between pinion 156 and gear 158. Similarly, pushing of a "to" push button will cause counterclockwise rotation of pinion 157 and gear 159 to take place. This will in turn cause clockwise rotation of the pinion 165 and gear 147 which in turn causes counterclockwise rotation of the altitude dial 84 and its contact plate 184. This altitude dial 84 is provided with a ratchet pawl 175 which is held against the teeth of the dial 84 by a spring 176 so as to prevent retrograde rotation of this dial 84. In other words, when the "to" push button is released the dial 84 will be prevented from rotating backwards by action of the pawl 175 thereby resulting in ratchet action between the pinion 157 and the gear 159 allowing the "to" push button to be returned to its normal position.

Restating these characteristics briefly, the shaft 130 may be rotated in a counterclockwise direction by reciprocating the "from" button whereas the gear 147 which directly draws altitude dial for a particular posting may be rotated in a clockwire direction by reciprocating the "to" push button. Such rotation is however limited as will directly be pointed out.

*Operation-mechanical transposing apparatus.*—Referring to Figs. 9 to 13 inclusive let us assume that a route is set up through posting 1 of fix B and that the airplane flying over this route is to fly at the 2000 foot altitude as is indicated by the numeral 2 of the dial 84 exposed in the lower part of Fig. 13. Let us also assume that the dial 84 for posting 2 assumes the "3" position as shown in Fig. 13. Let us now assume that this route is to be transposed from posting 1 to posting 2. Such transposition of the route circuit and associated apparatus will take place in a manner as already described in connection with Figs. 5A–5M and 8A to 8C of the drawings, and transposition of the altitude indication only is now to be considered.

As already pointed out hereinbefore when it is desired to transpose a route from one posting to another the "from" push button is depressed at such one posting and the "to" push button is depressed at such another posting. Let us now assume that the "from" button B1FM (see Fig. 13) is depressed and that this is followed by the depression of the "to" button B2TO. Note that this latter button is at another posting of the same fix. Depression of the "from" button B1FM will first cause a shifting of the cam plate 138 (see Fig. 12 construction) resulting in the lifting of the clutch plate 143 at posting 1. This lifting of the clutch plate 143 at posting 1 will cause the disc 145 to be lifted so that its lug 145ª lies in the plane of the arm 164ª associated with the pinion 164 at this same posting. Additional pushing of the "from" button B1FM will cause the rack 150 associated therewith (see Fig. 10) to rotate the pinion 156 and its associated gear 158 in a clockwise direction resulting in rotation of the pinion 164 in a counterclockwise direction until its arm 164ª engages the lug 145ª (see Figs. 10 and 13). The shaft 130 now assumes the "2" position.

Continued motion of the "from" push button B1FM is afforded by the spring 152. That is, even though the rack 150 can no longer move due to the fact that the pinion 164 has been stopped by the lug 145ª, continued movement of the push rod 131 of the push button B1FM is allowed. It may be pointed out here that counterclockwise rotation of the plate 145 at posting 1 is now permitted by reason of both the ratchet pawl 175 associated with the dial 84 and the ratchet mechanism contained between the pinion 157 and the gear 159, but more particularly by reason of pawl 175. The vertical shaft 130 which extends through all of the twenty-four postings now assumes the "2" position reflecting the 2000 foot altitude position. The operator will now depress the "to" button B2TO (the "from" button being held depressed) as a result of which its associated cam plate 138ª lifts the clutch plate 143 at posting 2, thereby causing the arm 164ª to be moved into the path of movement of the lug 145ª. Continued movement of the push button B2FM will cause movement of the push rod 131 associated therewith which through the medium of its rack 150 causes counterclockwise rotation of pinion 157 and gear 159 resulting in rotation of pinion 165 and gear 147 in a clockwise direction and rotation of the altitude dial 84 in a counterclockwise direction until the lug 145ª at posting 2 strikes the associated arm 164ª, and this will take place when the dial 84 has been moved to the 2000 foot altitude position "2." Continued movement of the push button B2TO to its fully depressed position is of course permitted by the spring 152 associated therewith.

With both of the buttons B1FM and B2TO fully depressed the cams 153 associated therewith will properly operate the various contacts necessary to cause the electrical transposition heretofore described to take place. Both of these buttons B1FM and B2TO may now be released as a result of which ratchet action between pinion 156 and gear 158 and between pinions 157 and 159 (see Fig. 9) takes place, the shaft 130 and the dial 84 of posting 2 being held in their then assumed position by the ratchet devices heretofore described. It is thus seen that the altitude dial 84 of posting 2 has been operated to the "2" position assumed by the altitude dial 84 of posting 1.

The operation just described required only a small angle of rotation of the altitude dial 84 for posting 2. Had the altitude dial for posting 2 assumed the "1" position this dial 84 would have been rotated in response to depression of the "to" button almost an entire revolution. It should be understood that in practice proper gear ratios will be employed to rotate the dial 84 at least $\frac{9}{10}$ of one revolution for a 10 altitude dial in response to a single depression of the associated "to" button. Similarly, the shaft 130 will be rotated in response to depression of a "from" button through an angle depending on the position then assumed by the associated dial 84.

It is thus seen that depression of a "from" button at one posting and a "to" button at another posting of the same fix will cause both electrical and mechanical transposition to take place.

*Three methods of using the invention.*—The invention disclosed herein may be used in at least three different ways as will presently be pointed out.

One way of using the present system is to post the flight routes on the display board strictly in accordance with altitude. In this case the transposing facilities may be used to make room on the board for new route postings where required, that is, if all of the postings assigned to a particular altitude at a particular fix are already occupied, a posting already posted on the board at this fix may be shifted by manipulation of the "from" and "to" buttons to make room in this fix and altitude for the proposed new route. This method of posting has the advantage of coordinating flight altitudes on the display board with the actual altitudes the airplanes, to which these flight routes are assigned, may fly.

A second way of using the apparatus of the invention resides in the posting of the flight routes strictly in accordance with arrival times, preferably having the earlier arrival times near the bottom of the board. In this case new routes will in almost every instance be added above the highest displayed route on the display board and cancellation of flight routes will of necessity always take place at the bottom of all effective postings in the various fixes. In other words, flight routes will always be added at the top and will be removed at the bottom from which it is readily seen that the so called picture displaying the flight routes gradually moves upwardly on the board as routes are removed at the bottom and eventually a new picture must be started at the extreme lower end of the board which later picture will then gradually work upwardly. The advantage of this method of posting resides in the showing at each fix the order of arrival times of airplanes so that it can be readily seen which airplane is first to fly over that fix according to the established schedule. It will be readily understood that there will be need for transposing apparatus because flight routes are authorized at varying times prior to the starting times. Also, in the case where one airplane overtakes another it will be necessary to make room on the board at all display points beyond the place where such overtaking of one airplane by another takes place.

A third method of use of the invention herein disclosed resides in the posting of all flight routes according to the altitudes the airplanes are to fly at particular fixes and to further post the flight routes within a particular altitude at a particular fix in accordance with arrival times of these airplanes, preferably posting the first airplane to arrive at the bottom and the last airplane to arrive at the top of that altitude for that fix. This method of posting facilitates analysis of flight routes insofar as picture conflict are concerned. That is, it enables the operator to more readily observe whether there is danger between an established and a proposed flight route, so that the flight route altitudes may be modified. Also, in case of single potential danger between two established flight routes the operator may caution the pilots of those airplanes where the potential danger exists.

The applicants have thus devised a novel flight route display system which facilitates not only the transposing of a display flight route circuit to a different location in a particular fix electrically but which also transposes indications displayed by posting units from one location to another location electrically and furthermore provides mechanical transposing apparatus for transposing altitude indications on a control board mechanically, and it should be understood that the particular circuits and devices shown have been selected to afford ready disclosure of the invention and the functions it performs and have not been shown in a limiting sense and it should be understood that various changes, additions and modifications may be made without departing from the spirit or scope of the invention except as demanded by the scope of the following claims.

What we claim as new is:

1. In combination, a posting unit having a plurality of lead-in wires permanently connected to the wires of a secondary bus and including operating means effective when all but one of said wires of said secondary bus are energized to operate said unit to a position corresponding to said one deenergized bus wire, a primary bus having one wire for each wire of said secondary bus, a relay connected to each wire of said primary bus each effective when picked up to apply current to all wires of said secondary bus except the wire corresponding to the wire of said primary bus to which such energized relay is connected, and means for applying current to one wire of said primary bus.

2. In combination, two posting units each having a lead-out wire and having a plurality of lead-in wires connected to the wires of a secondary bus and including operating means effective when all but one of said wires of said secondary bus are connected to one terminal of a source and said lead-out wire is connected to the other terminal of such source to operate such unit to a position corresponding to said one deenergized bus wire, a primary bus having one wire for each wire of said secondary bus, a relay connected to each wire of said primary bus each effective when picked up to apply current to all wires of said secondary bus except the wire corresponding to the wire of said primary bus to which such energized relay is connected, and contacts associated with each of said posting units for energizing that wire of said primary bus corresponding to the position then assumed by such posting unit, whereby if a source of current is connected to said contacts of one posting unit and the lead-out wire of another posting unit is connected to the other terminal of said first mentioned source said another posting unit is operated to the same position as is assumed by said one posting unit through the medium of one of said relays.

3. In an airplane flight route display system, a display board having report stations thereon arranged horizontally, a plurality of display areas on said board for each station arranged one above another each display area having at least one posting unit each unit having a plurality of lead-in wires connected to corresponding wires of a secondary bus and operated to a position corresponding to one of said bus wires if all bus wires except said one bus wire are energized, a control board corresponding to said display board provided with corresponding report stations and having a control area for each corresponding display area on the display board, a token characteristic of a particular airplane, manually controlled means associated with each control area, a primary bus having one wire for each wire of said secondary bus, a token receptacle associated with each control area, a relay connected to each wire of said primary bus and effective when energized to energize all of the wires of said secondary bus except the wire corresponding to the wire such energized relay is connected to, and means including said token when located in a receptacle of one of said control areas and the control means of other control areas corresponding to the altitudes an airplane is to fly over other stations for displaying in corresponding display areas on said display board the identifying character of the airplane by causing said token to energize a particular wire of said primary bus and by causing said control means to identify the proper display areas.

4. In combination, an airplane flight display system including a plurality of control panels one panel for each of a plurality of fixes defining a ground route, a plurality of posting areas for each panel located above each other each defining the altitude a particular airplane is to fly over such fix, a posting dial for each posting area, rotatable means for each posting dial which by the position it assumes characterizes a particular condition, manually controllable means for operating said rotatable means, a first and a second manually operable means for each posting area, and means including a member extending to all of the posting areas of a particular panel effective if a first manually operable means for one posting area and a second manually operable means for another posting area is operated the posting dial of said another posting area is operated mechanically through the medium of said member to display the same character as was formerly displayed by the posting unit in said one posting area.

5. In combination, an airplane flight display board including a plurality of panels one panel for each of a plurality of fixes defining a ground route, a plurality of posting areas for each panel located above each other each defining the altitude a particular airplane is to fly over such fix, a posting unit for each posting area, rotatable means for each posting unit which by the position it assumes characterizes a particular fact, means controlled from a remote point for operating said rotatable means, a route circuit passing through posting areas defining a particular route which may vary in altitude, a first and a second manually operable means for each posting area, and means effective if a first manually operable means for one posting area and a second manually operable means for another posting area is simultaneously operated the posting unit of said another posting area is operated to display the same character as was formerly displayed by the posting unit in said one posting area and to establish a new route circuit passing through said another posting area.

6. In combination, an airplane flight display board including a plurality of panels one panel for each of a plurality of fixes defining a ground route, a plurality of posting areas for each panel located above each other each defining the altitude a particular airplane is to fly over such fix, a posting unit for each posting area, rotatable means for each posting unit which by the position it assumes characterizes a particular airplane, means controlled from a remote point for operating said rotatable means, circuit means for coordinating all of the posting areas characterizing the same airplane, a first and a second manually operable means for each posting area, and means effective if a first manually operable means for one posting area and a second manually operable means for another posting area is operated the posting unit of said another posting area is operated to display the same character as was formerly displayed by the posting unit in said one posting area and to cause said circuit means to include in its coordinated posting areas the said another posting area and to exclude therefrom the said one posting area.

7. In an airplane flight display system, the combination with a control board and a flight progress board, each of said boards including a plurality of panels corresponding to successive fixes along a ground route, each panel on the control board having a plurality of control areas arranged above each other and each panel on the flight progress board having corresponding display areas, a control dial in each control area which in its various positions displays various altitudes, an electrically operated posting unit for displaying altitudes in each of said display areas, means including interconnecting circuits for controlling each altitude posting unit by the control dial in the corresponding control panel to cause such posting unit to display the same altitude as is displayed by its associated control dial, a first and a second control button in each control area, and means effective if a first button in one control area is depressed while the second button in another control area of the same fix is depressed to cause the control dial in the said another control area to assume the indicating position then assumed by the control dial in said one control area.

8. In an airplane flight display system, the combination with a control board and a flight progress board, each of said boards including a plurality of panels corresponding to successive fixes along a ground route, each panel on the control board having a plurality of control areas arranged above each other and each panel on the flight progress board having corresponding display areas, a control dial in each control area which in its various positions displays various altitudes, an electrically operated posting unit for displaying altitudes and an electrically operated airplane identification posting unit in each of said display areas, means including interconnecting circuits for controlling each altitude posting unit by the control dial in the corresponding control panel to cause such altitude posting unit to display the same altitude as is displayed by its associated control dial, a first transposing button and a second transposing button in each of said control areas, means effective if said first transposing button in one control area and said second transposing button in another control area are depressed to cause the control dial in said another control area to assume the indicating position then assumed by the control dial in said one control area and for causing the identification posting unit in the display area corresponding to said another control area to assume the indicating position then assumed by the identification posting unit in the display area corresponding to said one control area.

9. In combination, a panel board having a plurality of panels each corresponding to a fix along the right of way, a plurality of posting areas for each panel, a manually operable indicating dial for each posting area, a "from" button and a "to" button for each area, and means effective to operate the dial in one area to display the same indication as is displayed by the dial in another area of the same fix when a "from" button only and located in said another area and a "to" button only and located in said one area are depressed.

10. In combination, a display board and a control board each having a plurality of fixes, a plurality of posting areas for each fix on said display board, a control area on said control board for each posting area on said display board, posting units in each posting area for posting information by the position assumed by indicators of such posting units, a manually operable indicating dial in each control area, a first button and a second button for each control area, and means effective to display in one posting area the information then displayed in another posting area of the same fix and to then extinguish the information displayed in said another posting area and to change the indicating dial in the control area corresponding to said one posting area to display the indication then displayed by the indicating dial in the control area corresponding to said another posting area when a first button in a control area corresponding to said another posting area and a second button in a control area corresponding to said one posting area are depressed.

11. In combination, an indication bus consisting of a plurality of wires, a control bus consisting of a plurality of wires one wire for each wire of said indication bus, a plurality of posting units permanently connected to said control bus each having an actuating coil and a rotary contact for connecting such coil to the wires of said control bus one at a time as it is operated, whereby if all but one of such wires of the control bus are energized such posting unit may be operated to a position corresponding to the wire then deenergized, a plurality of control rotary contacts one for each posting unit and each at times energizing one wire at a time only of said indication bus and all permanently connected to such indication bus, and conversion relays one connected to each wire of said indication bus and having contacts for applying current to each wire of said control bus except the wire corresponding to the wire of said indication bus to which such relay is connected, whereby any posting unit may be operated to a position corresponding to the position assumed by another posting unit.

12. A rotary stick relay comprising, a shaft, means for rotating said shaft, a seeker rotary contact permanently fastened to said shaft which upon rotation of said shaft wipes over stationary seeker contacts, a second rotary contact at times operable by said shaft and out of engagement with other stationary contacts one for each of said seeker stationary contacts, an electro-magnet which if deenergized locks said second rotary contact to said shaft and which if energized holds said second rotary contact stationary and in contact with one of said another stationary contacts, and a circuit for said electro-magnet including said seeker rotary and one of said seeker stationary contacts in series.

13. A rotary stick relay comprising, a shaft, means for rotating said shaft, a seeker rotary contact permanently fastened to said shaft which upon rotation of said shaft wipes over stationary seeker contacts, a second rotary contact at times operable by said shaft and out of engagement with other stationary contacts one for each of said seeker stationary contacts, an electro-magnet which if deenergized locks said second rotary contact to said shaft and which if energized holds said second rotary contact stationary and in contact with one of said another stationary contacts, a circuit for said electro-magnet including said seeker rotary and one of said seeker stationary contacts in series, and a holding circuit for said electro-magnet for holding it energized after it has once assumed its energized condition.

14. A display board having a plurality of panels each corresponding to a fix along the ground of an air route, a plurality of posting areas for each fix, a posting unit including a movable indicating dial for each area, manually operable means for each area, and transposing means effective to directly operate the posting unit in one area to display the same indication as is displayed by a posting unit in another area of the same fix when said manually operable means for said another area and said manually operable means for said one area are operated, said transposing means including contacts of the posting unit for said another area assuming positions to manifest that indication.

15. In a display system for displaying the progress of airplanes over air routes, the combination with a bus including a plurality of wires which by their condition of energization manifest a fact to be displayed, a plurality of posting units each including a fixed contact for each of said wires and a rotary contact capable of engaging said fixed contacts one at a time said fixed contacts being at all times connected to the wires of said bus, manifesting means including another rotary contact of a posting unit to energize said bus to manifest the indication displayed by such posting unit, and transposing means for rendering the manifesting means as to one posting unit effective simultaneously with the act of rendering another posting unit responsive to the condition of energization of said bus, whereby said other posting unit may be caused to display the same indication as was formerly displayed by said one posting unit.

16. In a display system for displaying the progress of airplanes over air routes, the combination with a bus including a plurality of wires which by their condition of energization manifest a fact to be displayed, a plurality of posting units each including a fixed contact for each of said wires and a rotary contact capable of engaging said fixed contacts one at a time, control means for each unit at times rendering such posting unit active so as to respond to the condition of energization of said bus, manifesting means including another rotary contact of each posting unit for energizing the wires of said bus to manifest the indication then displayed by such posting unit, and transposing means for rendering the manifesting means as to one posting unit effective simultaneously with the rendering of the control means of another unit active to thereby cause such another posting unit to be operated to a position to display the same indication as is then displayed by said one posting unit.

17. In a display system for displaying the progress of airplanes over air routes, the combination with a bus including a plurality of wires which by their condition of energization manifest a fact to be displayed, a plurality of posting units each including a rotatable indicator and having one lead-in wire for each wire of said bus and for each position of said indicator said lead-in wires being permanently connected to the wires of said bus, control means including a lead-out wire for each posting unit for rendering such posting unit responsive to the then energized condition of said bus, means for determining the condition of energization of said bus in accordance with the fact to be displayed, repeat means including contacts of a particular posting unit which by their position manifest the indication then displayed by such unit to cause the wires of said bus to be energized to manifest that indication, and transposing means for rendering said control means for one posting unit and said repeat means of said particular posting unit active simultaneously to cause said particular posting unit to display the same indication as is then displayed by said one posting unit.

18. A display system for an air route having a plurality of fixes, a display area for each of a plurality of altitudes for each fix, circuit portions connecting adjacent fixes, means for establishing a route circuit including such circuit portions which route circuit is associated with the display areas for the various fixes which correspond with the altitude an airplane of a particular flight is to fly over such fixes, a first and a second manually operable control means for each display area, and transposing means effective if a first control means is operated for one display area included in a route circuit at a particular fix and a second control means is operated for another display area of the same fix said route circuit is re-routed so as to include said another display area instead of said one display area at such fix.

19. In combination, a control board, said board having a plurality of panels each panel corresponding to a fix along the right of way, a plurality of posting areas on each panel each posting area defining a different altitude, a manually operable indicating dial for each posting area, a first lever and a second lever for each posting area, and means including a member extending to all of the posting areas of a particular fix effective to mechanically operate the dial in one area to display the same indication as is then displayed by the dial in another area of that particular panel when a first lever only and located in said another area and a second lever only and located in said one area are actuated.

20. In combination; a display board and a control board each having a plurality of fixes; a plurality of posting areas for each fix on said display board; a control area on said control board for each posting area on said display board; posting units in each posting area for posting information as to airplane identity, altitude and arrival time by the position assumed by indicators of such posting units; a first button and a second button for each control area, and means effective to display in one posting area the information as to identity, altitude and arrival time then displayed in another posting area of the same fix and to then extinguish the information displayed in said another posting area only when the first button in a control area corresponding to said another posting area and the second button in the control area corresponding to said one posting area are depressed simultaneously.

21. In combination, a route circuit defining a route over one of a plurality of posting areas for one of each of a plurality of locations on the ground, a first button and a second button for each posting area for each location, indicating means associated with each posting area for identifying the conveyance moving over that route to which that posting unit has been assigned, and means responsive to the operation of a first button on one posting area and a second button on another posting area of the same location for transposing the portion of the route circuit passing through that location from said one posting area to said another posting area and for causing the indicating means at said another posting area to be controlled to identify the said conveyance.

22. In a flight route display system, the combination with a plurality of fixes each having a plurality of indicating areas, a plurality of direction indicator lamps for each area each capable of indicating the direction in which an airplane is to travel, means controlled from a remote point for energizing one of said indicator lamps for a particular area to characterize a particular direction of travel, a first button and a second button for each area and means responsive to the depression of a first button in one area and depression of a second button in another area for transposing the direction indication displayed in one area so as to be displayed in another area of the same fix by lighting the proper lamp therein.

SEDGWICK N. WIGHT.
OSCAR S. FIELD.